(12) United States Patent
Kim et al.

(10) Patent No.: US 11,934,624 B2
(45) Date of Patent: Mar. 19, 2024

(54) ELECTRONIC APPARATUS, CONTROL METHOD THEREOF, AND COMPUTER READABLE RECORDING MEDIUM FOR PROVIDING A CONTROL COMMAND TO AN EXTERNAL APPARATUS

(71) Applicant: SAMSUNG ELECTRONICS CO., LTD., Suwon-si (KR)

(72) Inventors: Byuksun Kim, Suwon-si (KR); Kyoungjae Park, Suwon-si (KR); Jinwuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/219,611

(22) Filed: Dec. 13, 2018

(65) Prior Publication Data

US 2019/0187873 A1    Jun. 20, 2019

(30) Foreign Application Priority Data

Dec. 19, 2017    (KR) .................. 10-2017-0174751

(51) Int. Cl.
*G06F 3/04812* (2022.01)
*G06F 3/038* (2013.01)
(Continued)

(52) U.S. Cl.
CPC .......... *G06F 3/04812* (2013.01); *G06F 3/038* (2013.01); *G06F 3/0482* (2013.01);
(Continued)

(58) Field of Classification Search
USPC ........................................................ 715/764
See application file for complete search history.

(56) References Cited

U.S. PATENT DOCUMENTS 9,257,035 B2   2/2016  Nishimura
10,194,191 B2  1/2019  Kim et al.
(Continued)

FOREIGN PATENT DOCUMENTS

CN    102981734 A    3/2013
CN    104618793 A    5/2015
(Continued)

OTHER PUBLICATIONS

International Search Report and Written Opinion dated Mar. 15, 2019, issued in International Application No. PCT/KR2018/015912.
(Continued)

*Primary Examiner* — Mohamed Abou El Seoud
*Assistant Examiner* — Conrad R Pack
(74) *Attorney, Agent, or Firm* — Nixon & Vanderhye P.C.

(57) ABSTRACT

An electronic apparatus is provided. The electronic apparatus includes: a communicator comprising communication circuitry configured to receive an image signal from an external apparatus; an input receiver comprising input receiving circuitry configured to receive a user operation command for controlling the external apparatus; and a processor configured to generate a control command to select a target object corresponding to the input user operation command from among a plurality of objects of a screen corresponding to the received image signal, and to control the communicator to transmit the generated control command to the external apparatus.

13 Claims, 17 Drawing Sheets

(51) Int. Cl.
  *G06F 3/0482* (2013.01)
  *G06F 3/04842* (2022.01)
  *G06F 3/04883* (2022.01)
  *G06F 3/16* (2006.01)
  *G08C 17/02* (2006.01)
  *G08C 19/28* (2006.01)
  *H04N 21/422* (2011.01)
  *H04N 21/436* (2011.01)
  *H04N 21/443* (2011.01)

(52) U.S. Cl.
  CPC ...... *G06F 3/04842* (2013.01); *G06F 3/04883* (2013.01); *G06F 3/167* (2013.01); *G08C 17/02* (2013.01); *G08C 19/28* (2013.01); *H04N 21/42203* (2013.01); *H04N 21/42204* (2013.01); *H04N 21/43615* (2013.01); *H04N 21/4438* (2013.01)

(56) References Cited

U.S. PATENT DOCUMENTS

| | | | |
|---|---|---|---|
| 2010/0235744 A1* | 9/2010 | Schultz | G11B 27/105 715/717 |
| 2013/0304795 A1 | 11/2013 | Kang et al. | |
| 2014/0059635 A1* | 2/2014 | Sirpal | H04N 21/4307 725/131 |
| 2014/0195981 A1 | 7/2014 | Lee et al. | |
| 2014/0282250 A1* | 9/2014 | Riddell | G06F 3/0485 715/830 |
| 2015/0339098 A1 | 11/2015 | Lee et al. | |
| 2015/0347461 A1 | 12/2015 | Moon et al. | |
| 2016/0011776 A1 | 1/2016 | Song | |
| 2016/0270195 A1* | 9/2016 | Ikehara | H05B 47/195 |
| 2016/0300480 A1* | 10/2016 | Mitra | G08C 17/02 |
| 2017/0025116 A1* | 1/2017 | Mehra | H04N 21/44213 |
| 2017/0168670 A1 | 6/2017 | Sovalin et al. | |
| 2017/0249063 A1* | 8/2017 | Yu | H04N 21/41265 |
| 2018/0136801 A1* | 5/2018 | Lee | G06F 3/04886 |
| 2018/0146233 A1* | 5/2018 | Satheesh | H04N 21/44008 |
| 2019/0011997 A1* | 1/2019 | Wisnia | G06F 3/0231 |

FOREIGN PATENT DOCUMENTS

| | | |
|---|---|---|
| EP | 3 040 841 | 7/2016 |
| EP | 3 193 497 | 7/2017 |
| JP | 2005-509210 | 4/2005 |
| JP | 2016-507917 | 3/2016 |
| JP | 2016-122331 | 7/2016 |
| KR | 10-2004-0082819 | 9/2004 |
| KR | 10-2015-0027279 | 3/2015 |
| KR | 10-1560314 | 10/2015 |
| KR | 10-2017-0071438 | 6/2017 |
| WO | 03/005719 | 1/2003 |
| WO | 2014/004914 | 1/2014 |
| WO | WO2018/098167 | 5/2018 |

OTHER PUBLICATIONS

Extended European Search Report dated Apr. 18, 2019 issued in European Patent Application No. 18213683.8.
European Office Action dated Oct. 5, 2020 for EP Application No. 18213683.8.
Chinese Office Action dated Nov. 3, 2021 for CN Application No. 201811553101.6.
Summons to Oral Proceedings dated Nov. 18, 2021 for EP Application No. 18213683.8.
Chinese Office Action dated Apr. 22, 2022 for CN Application No. 201811553101.6.
India Examination Report dated Mar. 7, 2022 for IN Application No. 202017027207.
Korean Office Action dated Apr. 26, 2022 for KR Application No. 10-2017-0174751.
Chinese Rejection Decision dated Dec. 21, 2022 for CN Application No. 201811553101.6.
Vietnamese Office Action dated Sep. 8, 2023 for VN Application No. 1-2020-03782.
IN Hearing Notice dated Jan. 6, 2024 for IN Application No. 202017027207.

* cited by examiner

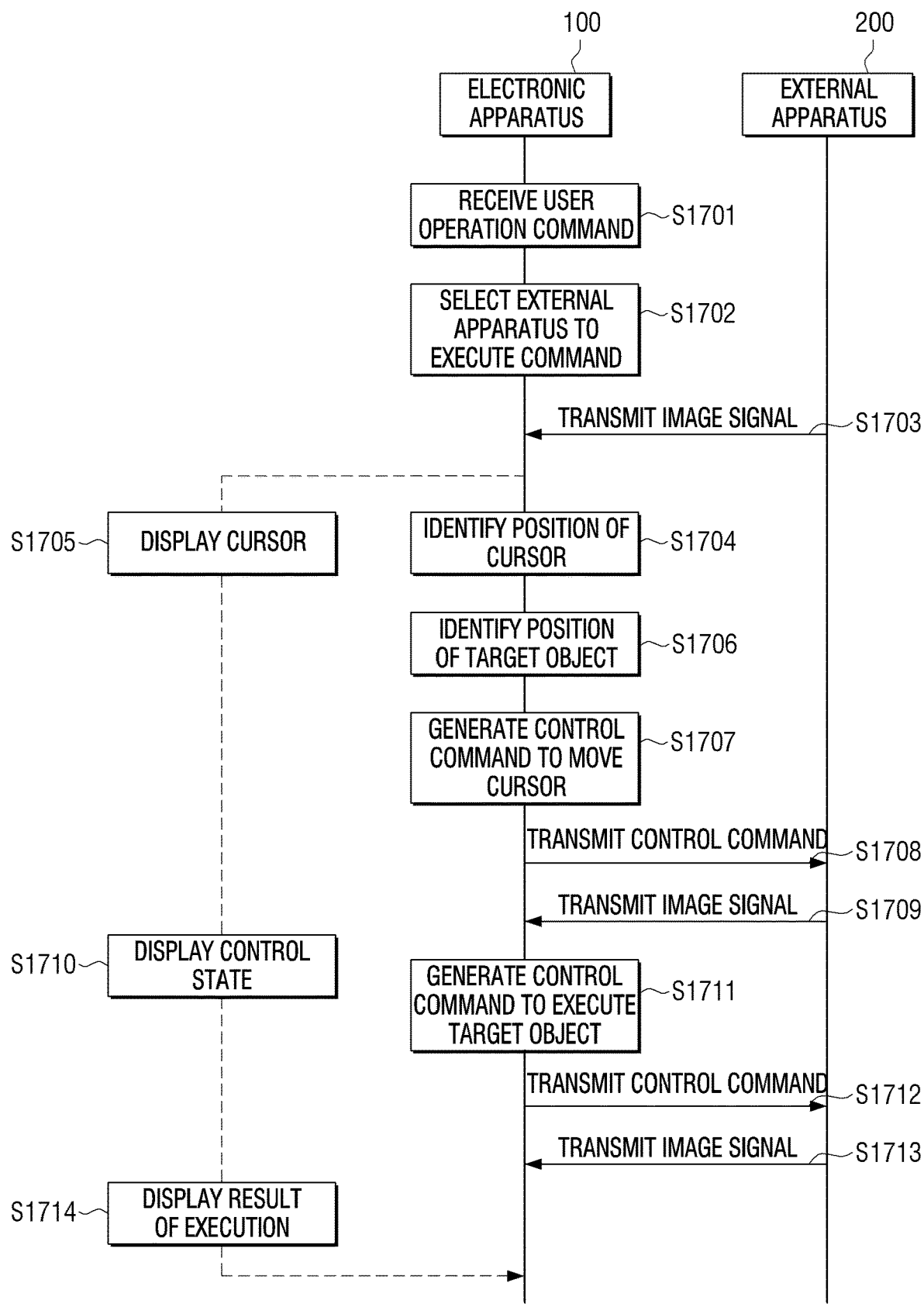

ELECTRONIC APPARATUS, CONTROL METHOD THEREOF, AND COMPUTER READABLE RECORDING MEDIUM FOR PROVIDING A CONTROL COMMAND TO AN EXTERNAL APPARATUS

CROSS-REFERENCE TO RELATED APPLICATION

This application is based on and claims priority under 35 U.S.C. § 119 to Korean Patent Application No. 10-2017-0174751, filed on Dec. 19, 2017, in the Korean Intellectual Property Office, the disclosure of which is incorporated by reference herein in its entirety.

BACKGROUND

Field

The present disclosure relates generally to an electronic apparatus, a control method thereof, and a computer-readable recording medium, and, for example, to an electronic apparatus which transmits a control command corresponding to an input operation command to an external apparatus, a control method thereof, and a computer-readable recording medium.

Description of Related Art

With the enhancement of electronic technology, various kinds of electronic products are developing and are being distributed. In particular, various kinds of electronic apparatuses such as televisions (TVs), mobile phones, personal computers (PCs), notebook PCs, personal digital assistants (PDAs), set-opt boxes, or the like are increasingly used in general households.

As electronic apparatuses are increasingly used, users' needs for various functions increase. Accordingly, manufacturers' efforts for meeting the users' needs increase and products provided with new functions are coming into the markets.

In recent years, external apparatuses such as set-top boxes, blu-ray disks, audio devices, mobile devices, or PCs are connected to display apparatuses and are used. In this case, when a user wishes to use a content provided by an external apparatus, the user generally uses an integrated remote control device.

However, when there is no integrated remote control device or the integrated remote control device does not operate well, the external apparatuses cannot be controlled, and, even when the integrated remote control device operates well, the user should go through various procedures operations such as selecting an external apparatus, moving to a content, and inputting a content execution command, in order to select a desired content, which may cause inconvenience. In addition, the user should know contents provided by a connected external apparatus in advance, and if not, the user should select external apparatuses one by one and should identify whether each external apparatus is providing a content.

SUMMARY

Various example embodiments may address the above disadvantages and other disadvantages not described above.

Various example embodiments provide an electronic apparatus which provides an external apparatus with a control command which is generated using an image signal provided from the external apparatus, a control method thereof, and a computer readable recording medium.

According to an example aspect of an example embodiment, an electronic apparatus is provided, the electronic apparatus including: a communicator comprising communication circuitry configured to receive an image signal from an external apparatus; an input receiver comprising input receiver circuitry configured to receive a user operation command for controlling the external apparatus; and a processor configured to generate a control command to select a target object corresponding to the input user operation command from among a plurality of objects included in a screen corresponding to the received image signal, and to control the communicator to transmit the generated control command to the external apparatus.

The processor may be configured to identify an object where a cursor is positioned from among the plurality of objects, to generate a cursor movement command to move the cursor to the target object from the identified object, and to control the communicator to transmit the generated cursor movement command to the external apparatus.

The processor may be configured to identify arrangements of the plurality of objects, and to generate a cursor movement command based on the identified arrangements.

When an object where the cursor is currently positioned after the cursor movement command is transmitted is the target object, the processor may be configured to control the communicator to transmit an object execution command to the external apparatus.

When the cursor movement command includes a plurality of four-direction movement commands, the processor may be configured to control the communicator to transmit the plurality of four-direction movement commands to the external apparatus in sequence on a predetermined time interval.

The input receiver may be configured to receive a user voice signal, and the processor may be configured to identify the target object from among the plurality of objects based on a voice recognition result regarding the input voice signal.

The processor may be configured to obtain keywords of the plurality of objects by analyzing images regarding the plurality of objects, and to identify the target object from among the plurality of objects based on the obtained keywords and the voice recognition result.

The electronic apparatus may further include a memory configured to store a control command regarding a predetermined operation command, and, when the predetermined operation command is input through the input receiver, the processor may be configured to control the communicator to transmit the stored control command to the external apparatus.

The communicator may be configured to receive an image signal from each of a plurality of external apparatuses, and the processor may be configured to identify an external apparatus, to provide a screen including the target object corresponding to the user operation command from among the plurality of external apparatuses, and to control the communicator to transmit the generated control command to the identified external apparatus.

The processor may be configured to generate a control command including an instruction for executing an application and/or a content corresponding to the target object.

The electronic apparatus may further include a display configured to display the screen corresponding to the received image signal.

According to another example aspect of an example embodiment, a control method of an electronic apparatus is provided, the method including: receiving an image signal from an external apparatus; receiving an input of a user operation command for controlling the external apparatus; generating a control command to select a target object corresponding to the input user operation command from among a plurality of objects included in a screen corresponding to the received image signal; and transmitting the generated control command to the external apparatus.

The generating may include identifying an object where a cursor is positioned from among the plurality of objects and generating a cursor movement command to move the cursor to the target object from the identified object, and the transmitting may include transmitting the generated cursor movement command to the external apparatus.

The generating may include identifying arrangements of the plurality of objects and generating a cursor movement command based on the identified arrangements.

The method may further include, when an object where the cursor is currently positioned after the cursor movement command is transmitted is the target object, transmitting an object execution command to the external apparatus.

The transmitting may include, when the cursor movement command includes a plurality of four-direction movement commands, transmitting the plurality of four-direction movement commands to the external apparatus in sequence on a predetermined time interval.

The receiving the input may include receiving a user voice signal, and the generating may include generating a control command to select the target object which is identified based on a voice recognition result regarding the input voice signal.

The generating may include obtaining keywords of the plurality of objects by analyzing images regarding the plurality of objects and generating a control command to select the target object which is identified based on the obtained keywords and the voice recognition result.

The method may further include: receiving an image signal from each of a plurality of external apparatuses; and determining an external apparatus to provide a screen including the target object corresponding to the user operation command from among the plurality of external apparatuses, and the transmitting may include transmitting the generated control command to the identified external apparatus.

According to another example aspect of an example embodiment, a non-transitory computer readable recording medium is provided, the non-transitory computer readable recording medium having stored thereon a program for executing a control method of an electronic apparatus, the method including: receiving an image signal from an external apparatus; receiving an input of a user operation command for controlling the external apparatus; generating a control command to select a target object corresponding to the input user operation command from among a plurality of objects included in a screen corresponding to the received image signal; and transmitting the generated control command to the external apparatus.

Additional and/or other aspects and advantages of the disclosure will be set forth in part in the description which follows and, in part, will be apparent from the description.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 17 is a sequence diagram illustrating an example method for generating a control command according to an example embodiment.

DETAILED DESCRIPTION

Figure 1:
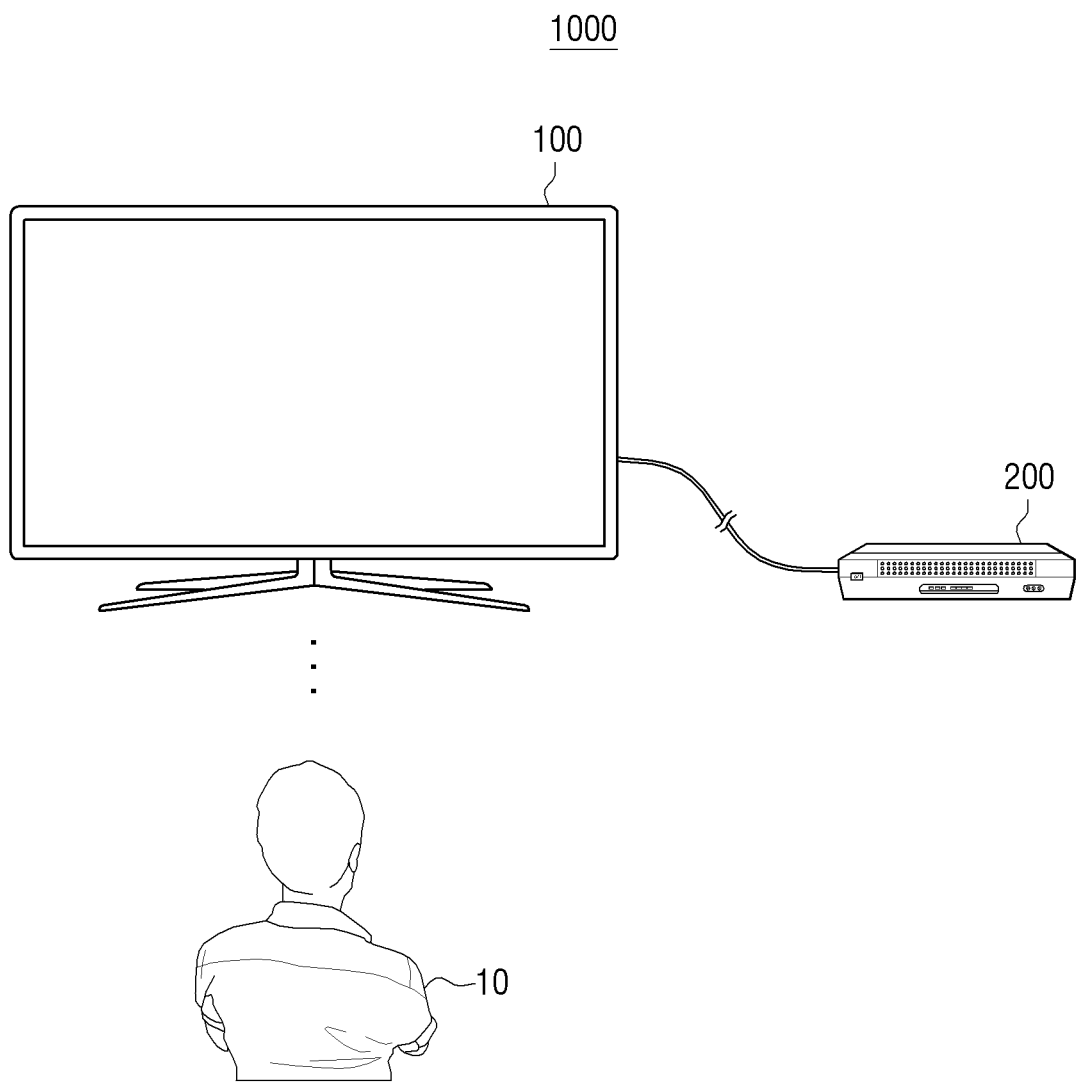
FIG. 1 is a diagram illustrating an example electronic apparatus control system according to an example embodiment.

Terms used in the following detailed description of various example embodiments will be explained briefly and the present disclosure will be described in greater detail.

The terms used in describing the various example embodiments are terms which are generally widely used and selected in consideration of the functions in the present disclosure. However, the terms may be changed according to an intention or a legal or technical interpretation of a person skilled in the art and the advent of new technology. In addition, some terms may be arbitrarily selected. In this case, meanings of the terms will be ascertained from corresponding detailed descriptions of the present disclosure. Accordingly, the terms used in the present disclosure should be defined not based on names of the terms but based on the meanings of the terms and the entire descriptions of the present disclosure.

Various changes can be made to the various example embodiments of the present disclosure and various example embodiments may be provided, and specific embodiments will be described in greater detail through the drawings and the detailed descriptions. However, various example embodiments of the present disclosure are not limited to the specific embodiments and should be understood as including any modifications, equivalents and/or alternatives of example embodiments of the present disclosure. In addition, in the following description, detailed descriptions of well-known functions or configurations may be omitted where they would unnecessarily obscure the subject matters of the present disclosure with unnecessary detail.

The terms such as "first" and "second" may be used to explain various elements, and do not limit the corresponding elements. These terms may be used for the purpose of distinguishing one element from another element.

The singular forms are intended to include the plural forms as well, unless the context clearly indicates otherwise. The terms "include" or "is configured" indicate the presence of features, numbers, steps, operations, elements, and components described in the disclosure, or any combination thereof, and do not preclude the presence or addition of one or more other features, numbers, steps, operation, elements, or components, or any combination thereof.

In addition, a "module" or "unit" used in example embodiments may perform one or more functions or operations and may be implemented using hardware or software or any combination of hardware and software. In addition, a plurality of "modules" or a plurality of "units" may be integrated into one or more modules, except for a "module" or "unit" which needs to be implemented by specific hardware and may be implemented as one or more processors.

Hereinbelow, various example embodiments of the present disclosure will be described in greater detail with reference to the accompanying drawings, such that an ordinary skilled person in the related art can easily understand the present disclosure. However, the present disclosure may be implemented in various forms and is not limited to the embodiments described herein. In addition, in the drawings, portions having nothing to do with the descriptions may omitted to clearly describe the present disclosure, and similar reference numerals are used for similar elements throughout the disclosure.

Hereinafter, the present disclosure will be described in greater detail with reference to the accompanying drawings.

FIG. 1 is a diagram illustrating an example electronic apparatus control system according to an example embodiment.

Referring to FIG. 1, the electronic apparatus control system 1000 according to an embodiment includes an electronic apparatus 100 and an external apparatus 200. In this case, a user 10 may control the external apparatus 200 connected with the electronic apparatus 100 through an operation command on the electronic apparatus 100.

The electronic apparatus 100 may receive a content from the external apparatus 200 and may process the same. The electronic apparatus 100 may include various apparatuses provided with displays, such as, for example, and without limitation, TVs, mobile phones, smartphones, PDAs, notebook PCs, monitors, tablet PCs, e-books, electronic picture frames, kiosks, or the like. The electronic apparatus 100 may display the processed content. The electronic apparatus 100 may include various apparatuses without displays, such as, for example, and without limitation, servers, set-top boxes, or the like. In this case, the electronic apparatus 100 may transmit the processed content to another apparatus provided with a display.

The external apparatus 200 may be an apparatus that transmits contents to the electronic apparatus 100. The external apparatus 200 may be, for example, and without limitation, a broadcasting server, a set-top box, an external memory device, a Blu-ray disk, a PC, a mobile device such as a smart phone, or the like. The electronic apparatus 100 and the external apparatus 200 may be connected with each other in a wired manner such as, for example, and without limitation, a high definition multimedia interface (HDMI), or the like, and/or in a wireless manner such as, for example, and without limitation, WiFi, Bluetooth, or the like.

Although FIG. 1 depicts that one external apparatus 200 is connected to the electronic apparatus 100, a plurality of external apparatuses may be connected to the electronic apparatus 100.

The electronic apparatus 100 may recognize the external apparatus 200 connected therewith, and may establish a database (DB) based on the recognized information and may store the DB. For example, the electronic apparatus 100 may recognize a manufacturer of the external apparatus 200 connected therewith, a product name of the external apparatus 200, and an application and a content stored in the external apparatus 200, and may establish the DB based on the recognized information.

The DB may be established in various ways. For example, the user may directly input information regarding the external apparatus 200 to the electronic apparatus 100. The electronic apparatus 100 may automatically recognize information regarding the external apparatus 200 according to another embodiment. For example, the electronic apparatus 100 may obtain information regarding the external apparatus 200 from an image signal provided from the external apparatus 200. For example, the electronic apparatus 100 may obtain, for example, and without limitation, a logo, a manufacturer name, an application, or the like from a screen corresponding to the image signal provided by the external apparatus 200, which include information regarding the external apparatus 200.

For example, the electronic apparatus 100 may extract a manufacturer logo from a predetermined region of the screen corresponding to the image signal provided from the external apparatus 200 or may extract the manufacturer logo of the external apparatus 200 from a banner displayed on the screen, etc. The electronic apparatus 100 may obtain manufacturer information or apparatus information of the external apparatus 200 based on the extracted manufacturer logo. In the above-described embodiment, the electronic apparatus 100 may extract, for example, and without limitation, the logo, the manufacturer name, or the like from the predetermined region. However, this should not be considered as limiting. The electronic apparatus 100 may, for example, determine whether there is a recognition object in the whole region of the image. In this case, artificial intelligence (AI) technology may be applied, for example. The electronic apparatus 100 may determine what region of the image a recognition object such as, for example, and without limitation, a broadcasting logo, a manufacturer, or the like exists in by itself based on AI, and may recognize corresponding information.

In another example, when the external apparatus 200 is connected through the HDMI, the electronic apparatus 100 may obtain the information regarding the external apparatus 200 by identifying consumer electronics control (CEC) information. The CEC function may refer, for example, to a function of causing apparatuses connected with one another via an HDMI to control one another. When the external apparatus 200 supports the CEC function, the CEC information may include the information regarding the external apparatus 200.

The electronic apparatus 100 may obtain the information regarding the external apparatus 200 connected therewith using the above-described methods and may establish the DB based on the information. The electronic apparatus 100 may obtain the information regarding the external apparatus

200 at the time when the external apparatus 200 is connected or may obtain the information regarding the external apparatus 200 connected therewith when it is necessary to recognize the external apparatus 200, for example, when an operation command is input from the user 10.

The DB established as described above may be used to determine an external apparatus to execute an operation command input by the user 10. This determination may be referred to as recognizing the external apparatus 200. In another embodiment, the electronic apparatus 100 may download a database which is already established from an external source. In this case, the electronic apparatus 100 may recognize the external apparatus 200 using the downloaded database even when information is not received from the external apparatus 200.

In addition, the electronic apparatus 100 may generate a control code set for controlling the recognized external apparatus. For example, the electronic apparatus 100 may, for example, and without limitation, download a control code set for controlling the recognized external apparatus from an external source, or may pre-store control code sets corresponding to a plurality of external apparatuses, and may select a control code set for controlling the recognized external apparatus.

The user 10 may input an operation command regarding the electronic apparatus 100. For example, the user 10 may input an operation command to the electronic apparatus 100 using, for example, and without limitation, a dedicated remote control device for the electronic apparatus 100, a voice command, a button provided on the electronic apparatus 100, a touch screen provided on the electronic apparatus 100 or the like. In this case, the user 10 may input the operation command while viewing a screen corresponding to an image signal provided from the external apparatus 200.

The electronic apparatus 100 may generate a control command corresponding to the input operation command. In this case, the input operation command may be a complex command requiring a plurality of operations. In this case, the electronic apparatus 100 may analyze the input operation command and may divide the same into a plurality of control commands. For example, when the user 10 inputs a command saying, for example, "Play the movie A in App 4!" using a voice, the electronic apparatus 100 may analyze the input operation command first, and may divide the operation corresponding to the command into respective operations for performing the operation command. For example, the electronic apparatus 100 may analyze the input operation command, and may divide the operation corresponding to the command into, for example, and without limitation, (1) an operation of determining an external apparatus providing App 4, (2) an operation of receiving a home screen from the determined external apparatus, (3) an operation of moving a cursor to select the movie A, and (4) an operation of playing the movie A, and may generate control commands for executing the respective operations.

For example, the electronic apparatus 100 may recognize a screen corresponding to an image signal provided from the determined external apparatus 200, and may generate a control command corresponding to the operation command input by the user, based on a result of recognition. Such an operation of recognizing the screen may be performed when the external apparatus 200 is initially connected, or when the user inputs the operation command. In addition, the electronic apparatus 100 may transmit the generated control command to the external apparatus 200. For example, when a plurality of external apparatus 200 are connected, the electronic apparatus 100 may determine an external apparatus 200 capable of performing the operation corresponding to the operation command input by the user. In this case, the electronic apparatus 100 may determine the external apparatus 200 based on a result of recognizing screens corresponding to image signals received from the plurality of external apparatuses 200, respectively. In addition, the electronic apparatus 100 may determine the external apparatus 200 by using apparatus information received when the plurality of external apparatuses 200 are connected.

The electronic apparatus 100 may directly transmit the generated control command to the external apparatus 200 through, for example, and without limitation, an HDMI cable, or the like. The electronic apparatus 100 may indirectly transmit the control command to the external apparatus 200 through a remote control device.

In addition, the electronic apparatus 100 may receive an image signal which is a result of executing the transmitted control command from the external apparatus 200, and may provide the received image signal to the user 10, such that the user 10 can have the same feedback as a plurality of operation commands are input even if one operation command is input.

According to various example embodiments as described above, even when the user inputs an operation command to the electronic apparatus 100 rather than to the external apparatus 200, the external apparatus 200 can be controlled, and thus an extra apparatus for controlling the external apparatus 200 is not required. In addition, compared to the related-art method which requires input of many operation commands to control the external apparatus 200, the method according to various example embodiments can control the same operations with a single operation command input, and thus user's convenience can be enhanced.

Figure 2:
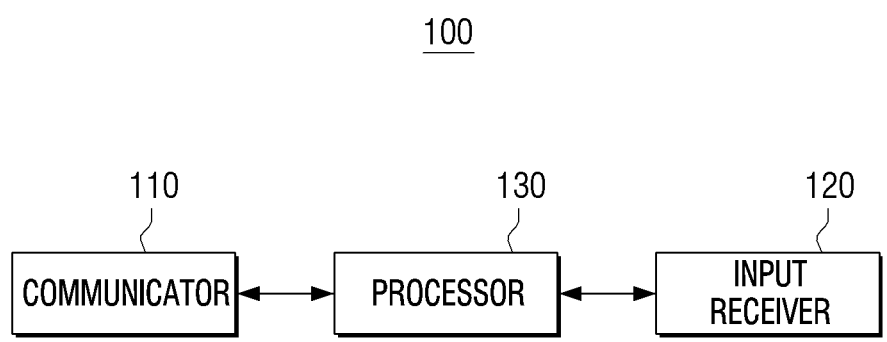
FIG. 2 is a block diagram illustrating an example configuration of an electronic apparatus according to an example embodiment.

FIG. 2 is a block diagram illustrating an example configuration of the electronic apparatus according to an example embodiment.

Referring to FIG. 2, the electronic apparatus 100 includes a communicator (e.g., including communication circuitry) 110, an input receiver (e.g., including input receiver circuitry) 120, and a processor (e.g., including processing circuitry) 130.

The communicator 110 may include various communication circuitry and may be configured to communicate with an external apparatus. For example, the communicator 110 may receive an image signal from the external apparatus. In addition, the communicator 110 may transmit a control command generated by the processor 130 to the external apparatus.

The communicator 110 may communicate with the external apparatus in a wired manner or wirelessly.

The input receiver 120 may include various input receiver circuitry and may be configured to receive a user's operation command. The user's operation command may be an operation command to control the external apparatus.

The input receiver 120 may include various input receiving circuitry, such as, for example, and without limitation, a microphone to receive a user's voice signal, or the like. The input receiver 120 may receive a signal corresponding to an operation command from a remote control device for remotely controlling the electronic apparatus 100. The input receiver 120 may include, for example, and without limitation, a touch screen to receive a user's touch, may include a plurality of physical buttons provided on the electronic apparatus 100, or the like. The input receiver 120 may include, for example, and without limitation, a sensor, or the like, to detect a user's motion.

The processor 130 may include various processing circuitry and generate a control command corresponding to the user's operation command input through the input receiver 120 using a screen corresponding to the image signal received from the external apparatus, and may control the communicator 110 to transmit the generated control command to the external apparatus. The control command corresponding to the user's operation command may include, for example, and without limitation, a cursor movement command to move a cursor to a target object corresponding to the operation command and an execution command to execute the object where the cursor is positioned, or the like. The control command may include, for example, a command to execute an application or a content corresponding to the target object without moving the cursor.

For example, the processor 130 may analyze the screen corresponding to the received image signal and may extract information regarding a plurality of objects forming the screen. The object may include, for example, and without limitation, an icon of an application which is selectable in the screen, an application name, a thumbnail of a content, a name of the content, a menu, a channel name, a program name, or a character, a word, or an image which is not selectable but is included in the screen.

For example, the processor 130 may extract the information regarding the plurality of objects forming the screen, using, for example, and without limitation, automatic contents recognition (ACR) and optical character reader (OCR), or the like. The information regarding the objects may be information regarding arrangements of the plurality of objects in the screen and information regarding an application installed in the external apparatus or a content stored in the external apparatus.

The operation of analyzing the screen by the processor 130 may be implemented by, for example, an Artificial Intelligence (AI) system utilizing a machine learning algorithm and an application thereof.

For example, the AI system may be a computer system that implements intelligence at the level of the human brain, and enables a machine to learn and determine by itself, and increases a recognition rate as it is used. The AI technology may include machine learning (deep learning) technology which uses an algorithm for classifying/learning characteristics of input data by itself, and elementary technologies which simulate functions of the human brain, such as recognizing, determining, or the like, utilizing the machine learning algorithm.

The elementary technologies may include at least one of, for example, and without limitation, linguistic understanding technology for recognizing human language/characters, visual understanding technology for recognizing things like human vision, inference/prediction technology for inferring and predicting logically by determining information, knowledge representation technology for processing human's experience information as knowledge data, and operation control technology for controlling autonomous driving of vehicles or robot's movements.

Regarding image recognition technology, the visual understanding may refer, for example, to technology for recognizing and processing things like human vision, and may include, for example, and without limitation, object recognition, object tracking, image searching, person recognition, scene understanding, space understanding, image enhancement, or the like.

Regarding technology for recommending information, the inference and prediction may refer, for example, to technology for inferring and predicting logically by determining information, and may include, for example, and without limitation, knowledge/probability-based inference, optimization prediction, preference-based planning, recommendation, or the like.

Regarding query processing technology, the knowledge representation may refer, for example, to technology for automating human's experience information as knowledge data, and may include, for example, and without limitation, knowledge establishment (data generation/classification), knowledge management (data utilization), or the like.

When a plurality of external apparatuses are connected to the electronic apparatus 100, the processor 130 may analyze screens received from the plurality of external apparatuses, and may extract information regarding an application or a content that can be provided by each external apparatus.

The processor 130 may determine a position of a cursor to select an object in the screen. For example, the processor 130 may determine what object in the screen corresponding to the received image signal the cursor is placed on. The cursor may refer, for example, to a mark indicating an input position on a display screen, and may be, for example, and without limitation, a pointer such as an arrow, a highlight surrounding a boundary of an object to be selected, a predetermined image displayed on a certain region in an object to be selected, or the like. For example, the processor 130 may determine the position of the cursor by extracting a brightest region (in the case of a highlight) or a region displaying a predetermined image corresponding to the shape of the cursor, by analyzing the screen. In this case, the processor 130 may determine what object the cursor is placed on, based on arrangements of the objects in the screen, and may grasp the position of the cursor by calculating coordinate information where a specific point of the cursor is positioned on the screen.

The processor 130 may determine a target object corresponding to the input user operation command. In this case, when the user inputs the operation command by using a voice signal, the processor 130 may recognize the user's voice, and may determine a target object corresponding to the operation command. For example, the processor 130 may extract a keyword regarding each of the plurality of objects in the process of analyzing the screen, and may determine the target object based on the extracted key word and the result of analyzing the user's voice. The processor 130 may control the communicator 110 to transmit the received voice signal to the external apparatus as it is.

When the user inputs a predetermined operation command, the processor 130 may determine a target object corresponding to the input operation command. The predetermined operation command may refer, for example, to a control command set including a plurality of control commands necessary for performing a specific function. The predetermined operation command and the control commands corresponding thereto may be stored in a memory (not shown).

The user may input the operation command by, for example, manipulating a button corresponding to a predetermined control command among the buttons provided on the remote control device or the buttons provided on the electronic apparatus 100, by selecting a control command in a predetermined control command list displayed on the screen, or by selecting an object through movement of a highlight. In this case, the control command list will be described in greater detail below with reference to FIG. 13.

In addition, the processor 130 may generate a cursor movement command based on the position of the object where the cursor is placed, and the position of the target object corresponding to the user's operation command. In this case, the processor 130 may generate the cursor movement command based on arrangements of the plurality of objects identified through screen recognition. For example, the cursor movement command may include at least one four-direction movement command. In this case, the processor 130 may control the communicator 110 to transmit the at least one four-direction movement command to the external apparatus in sequence on a predetermined time interval. The cursor movement command operation as described above will be described below in greater detail with reference to FIGS. 10, 11, and 14.

In another embodiment, the processor 130 may generate a control command to cause the cursor to move to the target object through a continuous path such as a straight line, or to directly display the cursor on the target object without displaying a movement path of the cursor. In this case, the processor 130 may generate the cursor movement command by using coordinate information of the cursor and coordinate information of the target object.

The processor 130 may control the communicator 110 to transmit the generated cursor movement command to the external apparatus. The processor 130 may receive an image signal obtained after the generated cursor movement command is transmitted from the external apparatus through the communicator 110. In this case, when the object where the cursor is placed on the screen of the currently received image signal is the target object, the processor 130 may generate an object execution command, and may control the communicator 110 to transmit the generated object execution command to the external apparatus. In this case, the object execution command is a target object execution command and may be a command to execute the object where the cursor is currently placed.

According to various embodiments as described above, even when the user inputs the operation command to the electronic apparatus rather than to the external apparatus, the external apparatus can be controlled and thus a separate apparatus for controlling the external apparatus is not required. In addition, compared to the related-art method which requires input of many operation commands to control the external apparatus, the method according to various example embodiments can control the same operations with a single operation command input, and thus user's convenience can be enhanced.

Figure 3:
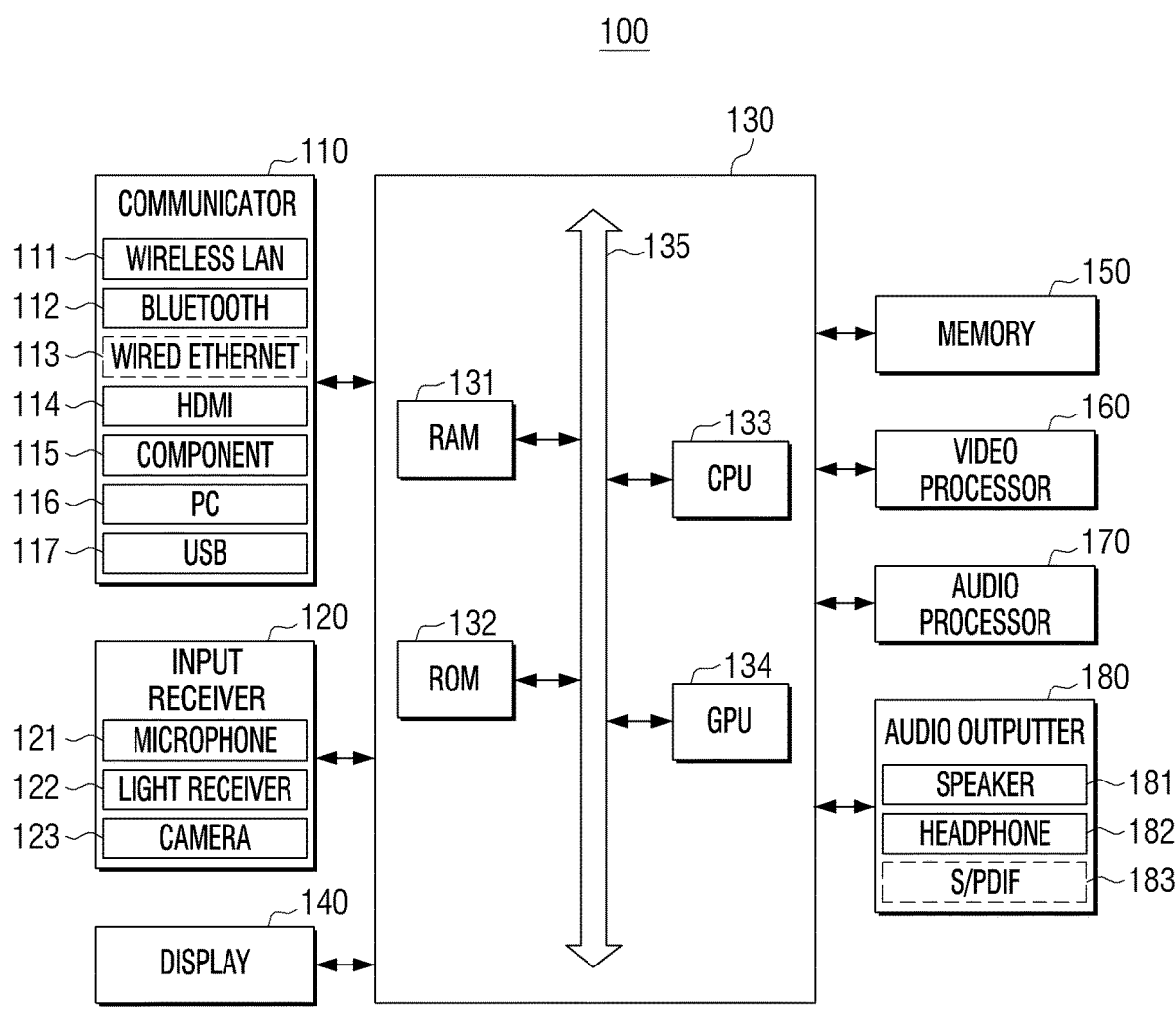
FIG. 3 is a block diagram illustrating an example configuration of the electronic apparatus of FIG. 2.

FIG. 3 is a block diagram illustrating an example configuration of the electronic apparatus of FIG. 2 in greater detail.

Referring to FIG. 3, the electronic apparatus 100 may include a communicator (e.g., including communication circuitry) 110, an input receiver (e.g., including input receiver circuitry) 120, a processor (e.g., including processing circuitry) 130, a display 140, a memory 150, a video processor (e.g., including video processing circuitry) 160, an audio processor (e.g., including audio processing circuitry) 170 and an audio outputter (e.g., including audio outputting circuitry) 180.

The communicator 110 may include various communication circuitry and communicate with an external apparatus in a wired manner or wirelessly.

For example, the communicator 110 may, for example, and without limitation, be connected with the external apparatus in a wireless manner such as a wireless local area network (LAN) 111, Bluetooth 112, or the like. In addition, the communicator 110 may, for example, and without limitation, be connected with the external apparatus using WiFi, Zigbee, or infrared data association (IrDA). The communicator 110 may include a connection port of a wired manner. In this case, the communicator 110 may include, for example, and without limitation, a wired Ethernet 113, an HDMI 114 port, a component 1151 port, a PC 116 port, a universal serial bus (USB) 117 port, or the like. In addition, the communicator 110 may include, for example, and without limitation, a digital visual interface (DVI), red green blue (RGB), DSUB, Super Video (S-Video), or the like.

The communicator 110 may transmit the control command generated by the processor 130 as described above to the external apparatus and may receive the image signal obtained after the transmitted control command is executed from the external apparatus. When there are a plurality of control commands, the communicator 110 may transmit a control signal including the plurality of control commands to the external apparatus, and may receive image signals obtained after the transmitted control commands are executed from the external apparatus in sequence.

The input receiver 120 may include various input receiving circuitry configured to receive a user's interaction such as a user's voice, a user's operation, or the like.

For example, the input receiver 120 may include, for example, and without limitation, a microphone 121 to receive a user's voice, a light receiver 122 to receive a light signal corresponding to a user input (for example, a touch, pressing, a touch gesture, a voice, or a motion) from a remote control device, a camera 123 to generate an image corresponding to a user's motion, or the like.

Control information may be extracted from the received light signal. The received light signal and/or extracted control information may be transmitted to the communicator 110.

The description of the same part as the input receiver 120 shown in FIG. 2 will not be repeated here.

The processor 130 may include various processing circuitry and control the display 140 to display the screen corresponding to the image signal received from the external apparatus. In this case, when the image signal obtained after the control command transmitted to the external apparatus is executed is received from the external apparatus, the processor 130 may control the display 140 to display the screen corresponding to the received image signal.

The processor 130 may include, for example, and without limitation, a random access memory (RAM) 131, a read only memory (ROM) 132, a central processing unit (CPU) 133, a graphic processing unit (GPU) 134 and a bus 135. The RAM 131, the ROM 132, the CPU 133, and the GPU 134 may be connected with one another through the bus 135.

The CPU 133 accesses the memory 150 and performs booting using an operating system (O/S) stored in the memory 150. In addition, the CPU 133 performs various operations using various programs, contents, and data stored in the memory 150.

The ROM 132 stores a set of commands for booting a system. When a turn-on command is input and power is supplied, the CPU 133 copies the O/S stored in the memory 150 onto the RAM 131 according to the command stored in the ROM 132, executes the O/S and boots the system. When booting is completed, the CPU 133 copies various programs stored in the memory 150 onto the RAM 131, executes the programs copied onto the RAM 131, and performs various operations.

When the booting of the electronic apparatus 100 is completed, the GPU 134 displays a UI on the display 140. For example, the GPU 134 may generate a screen including various objects such as an icon, an image such as a virtual keypad image, a text, and the like, using a calculator (not shown) and a renderer (not shown). The calculator calculates attribute values of the objects to be displayed, such as coordinate values, shape, size, color, or the like, according to the layout of the screen. The renderer generates the screen of various layouts including the objects based on the attribute values calculated by the calculator. The screen (or user interface window) generated by the renderer is provided to the display 140 and is displayed on a main display region and a sub display region.

The display 140 may display the screen corresponding to the image signal received under control of the processor 130. The display 140 may be implemented using various types of displays such as, for example, and without limitation, a liquid crystal display (LCD), an organic light emitting diode (OLED) display, a plasma display panel (PDP), or the like. The display 140 may include a driving circuit or a backlight unit which may be implemented in the form of, for example, and without limitation, an a-si TFT, a low temperature poly silicon (LTPS) TFT, an organic TFT (OTFT), or the like. In addition, the display 140 may be implemented as a flexible display.

In addition, the display 140 may include a touch sensor to detect a user's touch gesture. The touch sensor may be implemented by using various kinds of sensors such as a capacitive sensor, a resistive sensor, a piezoelectric sensor, or the like. The capacitive sensing may refer, for example, to a method which, when a part of a user's body touches the surface of the display 140, calculates touch coordinates by sensing minute electricity excited in the user's body using a dielectric substance coated on the surface of the display. The resistive sensing refers to a method which includes two electrode plates embedded in the display 140, and, when the user touches the screen, calculates touch coordinates by sensing a current flowing as the upper and lower plates of the touched point come into contact with each other. In addition, when the electronic apparatus 100 supports a pen input function, the display 140 may detect a user gesture using an inputting means such as a pen in addition to a user's finger. When the inputting means is a stylus pen including a coil therein, the electronic apparatus 100 may include a magnetic field sensor for sensing a magnetic field which is changed by the coil in the stylus pen. Accordingly, the electronic apparatus 100 may detect not only the touch gesture but also a proximity gesture, e.g., hovering.

In the above-described embodiment, the display function and the gesture sensing function are performed in the same configuration, but the functions may be performed in different configurations. In addition, according to various embodiments, the electronic apparatus 100 may not be provided with the display 140.

The memory 150 may store various programs and data necessary for the operation of the electronic apparatus 100. For example, the memory 150 may store a parameter for processing an input image.

In addition, the memory 150 may store information regarding each of the plurality of external apparatuses connected with the electronic apparatus 100. For example, the information regarding the external apparatus may be information regarding the type of the external apparatus or information regarding an application or a content which can be provided by the external apparatus. In this case, the information regarding the external apparatus may be extracted by analyzing the screen corresponding to the image signal received from the external apparatus by the processor 130. In this case, the information regarding the external apparatus may include arrangements of the objects forming the screen corresponding to the image signal.

In addition, the memory 150 may include a predetermined operation command and a control command regarding the predetermined operation command. For example, the predetermined operation command may be stored in the form of a list. In addition, the predetermined operation command may include an operation command which is frequently used based on user's using history. In this case, the predetermined operation command may be configured according a result of machine learning.

When the predetermined operation command is, for example, "Please record the program which is airing now on channel 11," the memory 150 may store a control command to select a set-top box among the plurality of external apparatuses, a control command to select channel 11, and a recording command to perform the predetermined operation command. The predetermined operation command the plurality of control commands corresponding thereto may be matched with each other and stored.

The video processor 160 may include various video processing circuitry for processing video data included in a content received through the communicator 110 or a content stored in the memory 130. The video processor 160 may perform various image processing operations such as decoding, scaling, noise filtering, frame rate conversion, resolution conversion, or the like with respect to the video data.

The audio processor 170 may include various audio processing circuitry for processing audio data included in a content received through the communicator 110 or a content stored in the memory 130. The audio processor 170 may perform various processing operations such as decoding, amplifying, noise filtering, or the like with respect to the audio data.

When a reproduction application for a multimedia content is executed, the processor 130 may drive the video processor 160 and the audio processor 170 to reproduce a corresponding content. In this case, the display 140 may display an image frame which is generated at the video processor 160 on at least one of the main display region and the sub display region.

The audio outputter 180 may include various audio outputting circuitry and outputs the audio data generated at the audio processor 170. For example, and without limitation, the audio outputter 180 may include at least one of a speaker 181, a headphone output terminal 182, a Sony/Philips digital interface (S/PDIF) output terminal 183, or the like.

In addition, according to an embodiment, the electronic apparatus 100 may further include various external input ports for connecting to various external terminals, such as a mouse having a USB connector connected to the electronic apparatus 100, a digital multimedia broadcasting (DMB) chip for receiving and processing a DMB signal, various sensors, or the like although they are not illustrated in FIG. 3.

Figure 4:
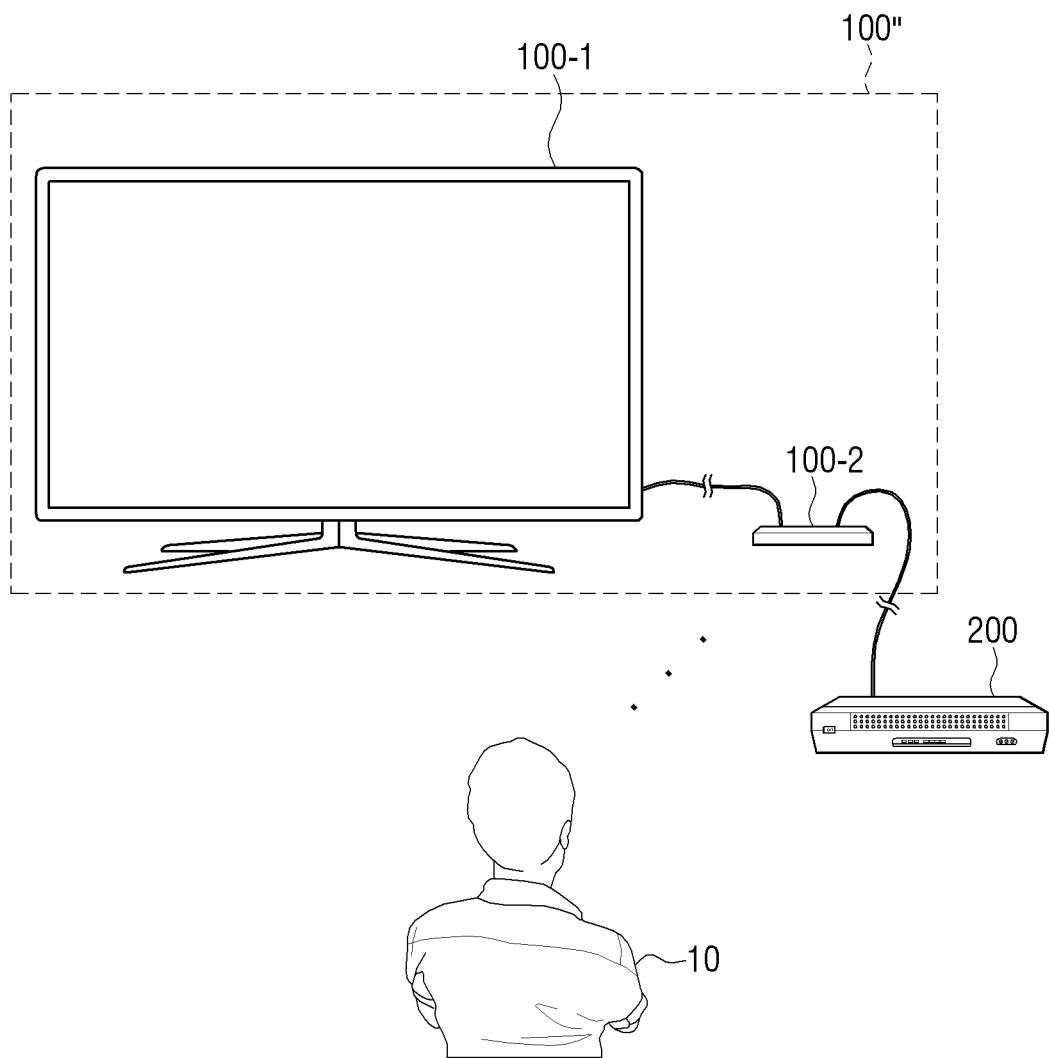
FIGS. 4, 5, 6 and 7 are diagrams illustrating various example embodiments of an electronic apparatus control system.

FIG. 4 is a diagram illustrating an example control system of an electronic apparatus according to another example embodiment.

Referring to FIG. 4, the electronic apparatus 100" includes an electronic apparatus 100-1 provided with a display, and a control box 100-2 which is separate from the electronic apparatus 100-1 and is connected with the electronic apparatus 100-1 via an optical cable.

The electronic apparatus 100-1 may, for example, be an apparatus which displays various screens, and may be implemented using, for example, and without limitation, a TV, a projector, a monitor, or the like.

The control box 100-2 may control the electronic apparatus 100-1 to display various screens and may perform the overall operations of the electronic apparatus 100 described above. For example, the control box 100-2 may analyze a screen corresponding to an image signal received from an external apparatus 200, may generate a control command corresponding to a voice command input by a user 10, and may transmit the generated control command to the external apparatus 200. The control box 100-2 may receive an image signal obtained after the control command is executed from the external apparatus 200, and may control the electronic apparatus 100-1 to display the received image signal.

The control box 100-2 may be provided with a microphone to receive a voice of the user 10, and the electronic apparatus 100-1 may transmit information regarding a voice of the user 10 input by using a microphone provided in the electronic apparatus 100-1 to the control box 100-2.

The control box 100-2 may include a processor for performing the operations according to the above-described various example embodiments and may include a communicator to communicate with an external apparatus such as the electronic apparatus 100-1, the external apparatus 200, or a remote control device (not shown). The processor of the control box 100-2 may correspond to the processor 130 described above with reference to FIGS. 2 and 3, and the communicator of the control box 100-2 may correspond to the communicator 110 described above with reference to FIGS. 2 and 3. In addition, the electronic apparatus 100-1 may correspond to the display 140 described above with reference to FIG. 3.

Since the separate control box 100-2 exists as described above, all peripheral devices may not be required to be connected to the electronic apparatus 100-1 in a complex manner, and may be connected to the control box 100-2, and the control box 100-2 may be simply connected to the electronic apparatus 100-1 via a single line. Accordingly, user's convenience can be enhanced. The control box 100-2 may, for example, be referred to as a one connect (OC) box or an invisible box, based on the above-described functions.

Figure 5:
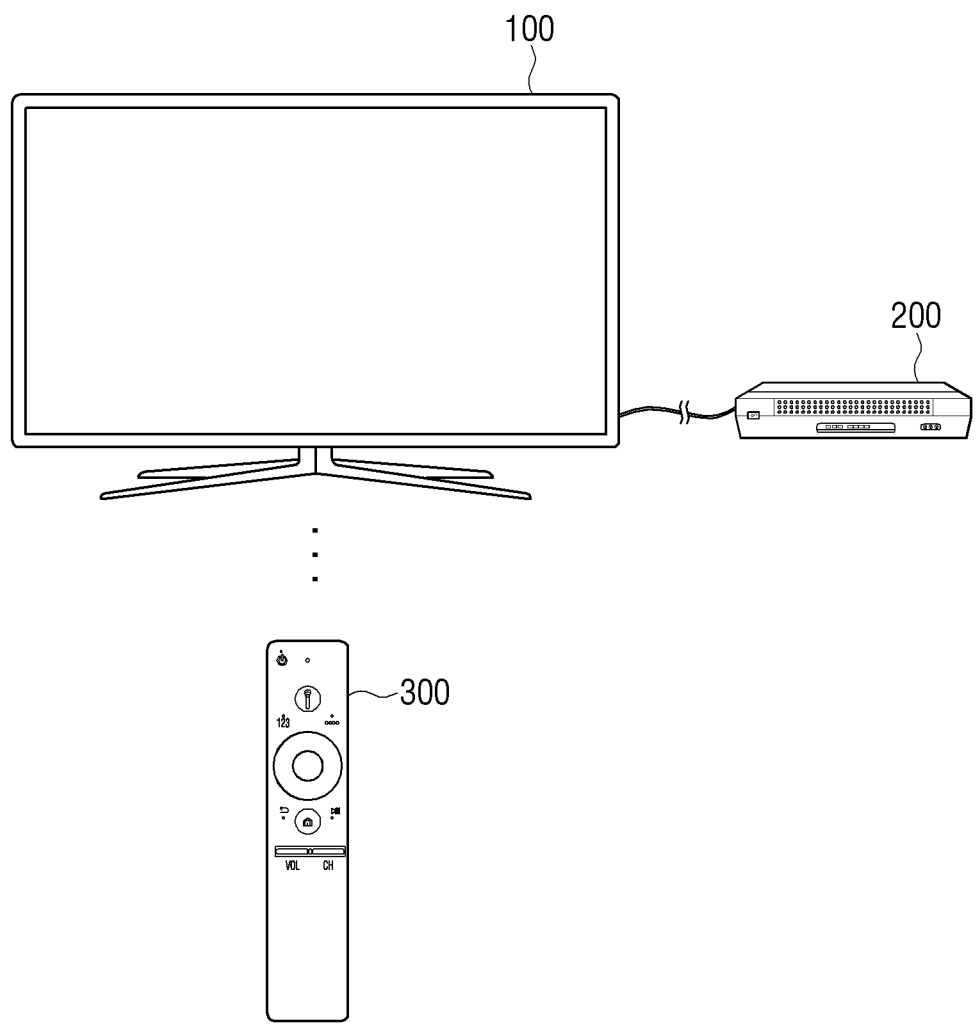

FIG. 5 is a diagram illustrating an example in which a command for operating an electronic apparatus 100 and an external apparatus 200 is input using a remote control device 300 rather than a user's voice according to another example embodiment.

Referring to FIG. 5, the remote control device 300 may be implemented using various types of devices capable of transmitting a control signal for controlling other devices. Although FIG. 5 depicts that the remote control device 300 is a remote controller, the remote control device 300 may, for example, and without limitation, be a smart phone, a PDA, a keyboard, a mouse, or the like.

In FIG. 5, the remote control device 300 may be a dedicated device for the electronic apparatus 100, and, when the electronic apparatus 100 receives a complex control command requiring a plurality of operations from the remote control device 300, the electronic apparatus 100 may generate a plurality of control signals corresponding to the received complex control command, and may transmit the generated control signals to the external apparatus 200.

In this case, when a button corresponding to the complex control command among a plurality of buttons provided on the remote control device 300 is pressed, the complex control command may be transmitted to the electronic apparatus 100 from the remote control device 300. In this case, the button itself may correspond to the complex control command or may be a button for displaying a UI corresponding to the complex control command and for selecting the displayed UI.

FIG. 5 illustrates an example in which the remote control device 300 indirectly controls the external apparatus 200 through the electronic apparatus 100. However, according to still another example embodiment, the remote control device 300 may obtain a control code set for controlling the external apparatus 200, and may directly control the external apparatus 200. This will be described in greater detail below with reference to FIG. 6.

Figure 6:
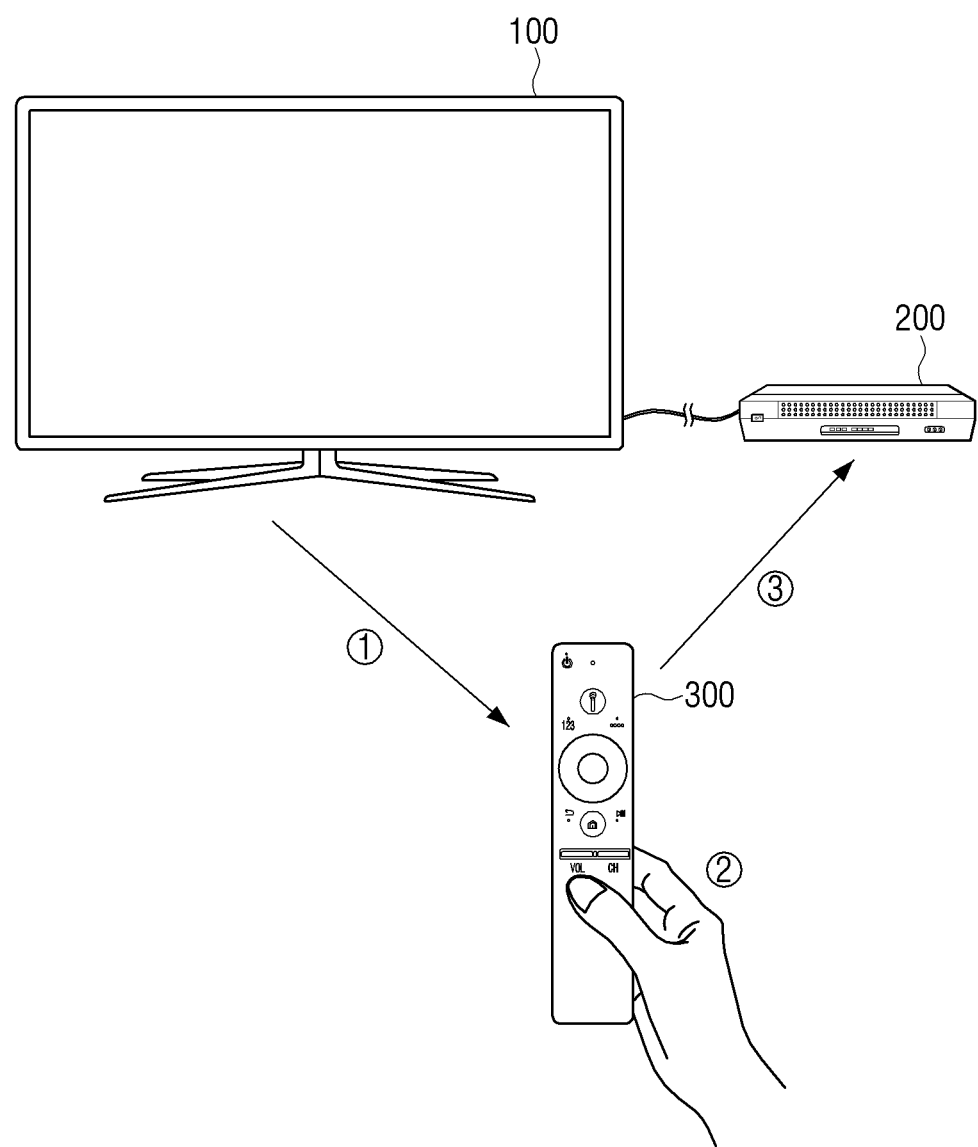

FIG. 6 is a diagram illustrating an example method by which the remote control device 300 directly controls the recognized external apparatus 200 according to an example embodiment.

Referring to FIG. 6, the electronic apparatus 100 may transmit a control code set for controlling the external apparatus 200 to the remote control device 300 (①). In this case, the external apparatus 200 may be an apparatus which provides an image signal to the electronic apparatus 100, and may be recognized by the electronic apparatus 100 by being connected with the electronic apparatus 100. In this case, the control code set may be transmitted in a communication method such as, for example, and without limitation, Bluetooth, WiFi, or the like. In addition, when a user operation is input through the remote control device 300 (②), the remote control device 300 transmits a control command corresponding to the user operation to the external apparatus 200 using the control code set provided from the electronic apparatus 100 (③). In this case, the control command may be transmitted to the external apparatus 200 in a wireless communication method such as, for example, and without limitation, IrDA, Bluetooth, WiFi, or the like. The external apparatus 200 may perform an operation corresponding to the control command transmitted from the remote control device 300.

In the above-described example embodiment, the remote control device 300 receives the control code set for controlling the external apparatus 200 from the electronic apparatus 100. However, the remote control device 300 may downloaded the control code set from other external sources. For example, the remote control device 300 may pre-store a plurality of control code sets for controlling various other apparatuses, including the control code set for controlling the external apparatus 200, and then, the remote control device 300 may obtain apparatus information or manufacturer information of the external apparatus 200 and may select the control code set for controlling the external apparatus 200 from the plurality of control code sets.

Since the control code set varies according to a manufacturer of an apparatus, the manufacturer of the external apparatus 200 needs to be identified to obtain the control code set of the external apparatus 200. In other words, it is necessary to identify which company's set-top box the external apparatus 200 is. There may be various methods for identifying the manufacturer of the external apparatus 200.

For example, and without limitation, the user may directly input information regarding the manufacturer of the external apparatus 200 to the remote control device 300, and the remote control device 300 may obtain the control code set for controlling the external apparatus 200, for example, from the electronic apparatus 100 based on the input information. The user may directly input the information regarding the manufacturer of the external apparatus 200 to the electronic apparatus 100, and the electronic apparatus 100 may transmit the control code set corresponding to the manufacturer of the external apparatus 200 to the remote control device 300. The electronic apparatus 100 may transmit the information regarding the manufacturer of the external apparatus 200 to the remote control device 300, and the remote control device 300 may download the control code set of the external apparatus 200 from an Internet source.

In addition to the method of directly inputting the information of the manufacturer of the external apparatus 200 by the user, a method of automatically obtaining the information of the manufacturer of the external apparatus 200 by the electronic apparatus 100 may be provided according to yet another example embodiment. For example, the electronic apparatus 100 may extract a unique characteristic identifying the manufacturer of the external apparatus 200 from the image signal provided from the external apparatus 200, and may obtain the information regarding the manufacturer of the external apparatus 200.

For example, the electronic apparatus 100 may obtain the information of the manufacturer of the external apparatus 200 by extracting a logo, a manufacturer name, or the like from the image signal provided by the external apparatus 200. For example, the electronic apparatus 100 may extract a manufacturer logo from a predetermined region of the screen corresponding to the image signal provided from the external apparatus 200 or may extract the manufacturer logo of the external apparatus 200 from a banner displayed on the screen. The electronic apparatus 100 may obtain manufacturer information or apparatus information of the external apparatus 200 based on the extracted manufacturer logo. In the above-described example embodiment, the electronic apparatus 100 may extract the logo, the manufacturer name, or the like from the predetermined region. However, this should not be considered as limiting. The electronic apparatus 100 may determine whether there is a recognition object in the whole region of the image. In this case, artificial intelligence (AI) technology may be applied, for example. The electronic apparatus 100 may determine what region of the image a recognition object such as a broadcasting logo, a manufacturer, or the like exists in by itself based on AI and may recognize corresponding information.

In another example, when the external apparatus 200 is connected through an HDMI, the electronic apparatus 100 may obtain the information of the manufacture of the external apparatus 200 by identifying CEC information. The CEC function is a function of causing apparatuses connected with one another via an HDMI to control one another. When the external apparatus 200 supports the CEC function, the CEC information may include the information of the manufacturer of the external apparatus 200.

Figure 7:
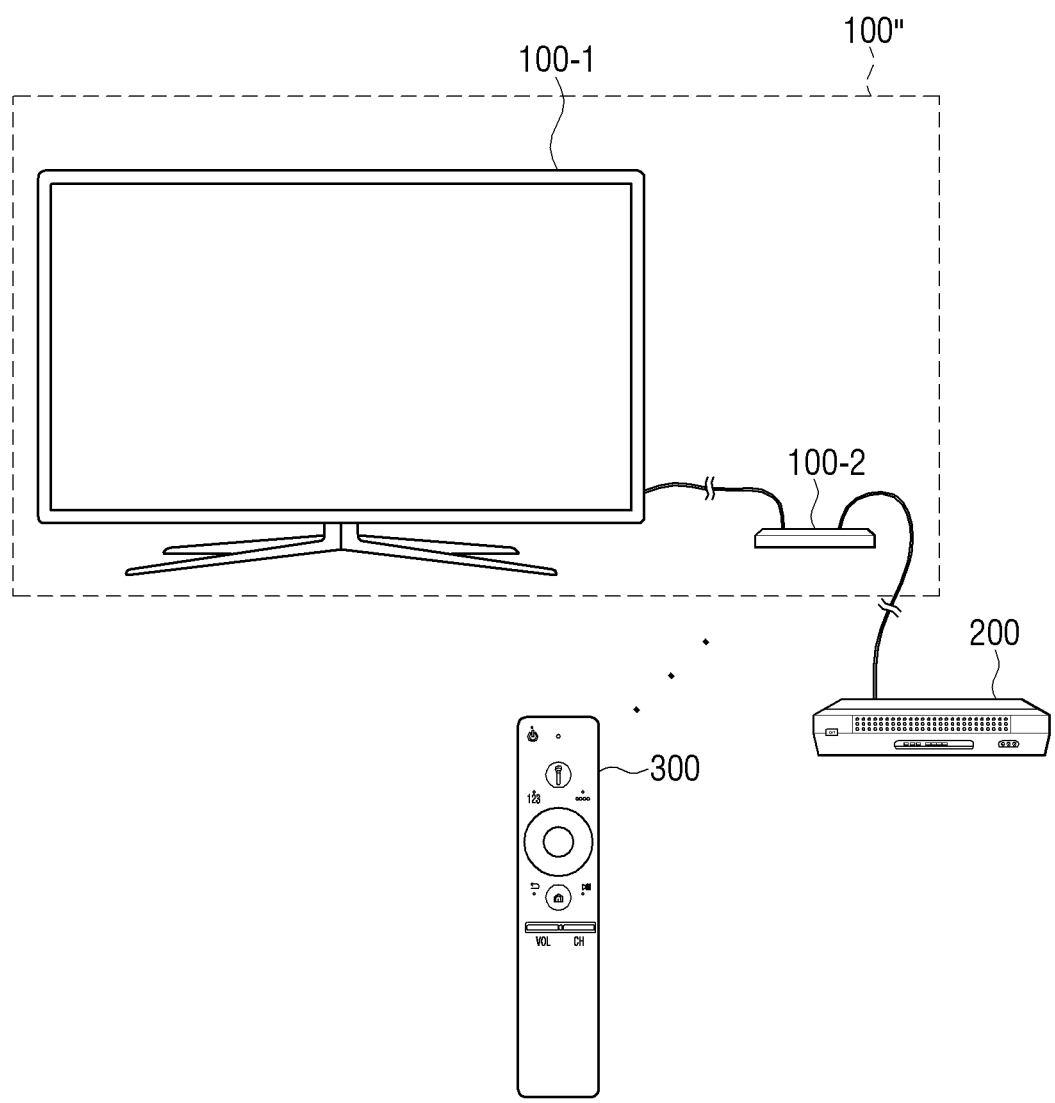

FIG. 7 is a diagram illustrating an example control system of an electronic apparatus according to still another example embodiment.

Referring to FIG. 7, the electronic apparatus 100" includes an electronic apparatus 100-1 provided with a display, and a control box 100-2 which is separate from the electronic apparatus 100-1 and is connected with the electronic apparatus 100-1 via, for example, and without limitation, an optical cable.

The control box 100-2 shown in FIG. 7 may perform the overall operations of the control box 100-2 shown in FIG. 4. However, the control box 100-2 shown in FIG. 7 may receive an operation command from a remote control device 300 through a communicator provided in the control box 100-2. In addition, a control command corresponding to the received operation command may be transmitted to the electronic apparatus 100-1 or the external apparatus 200.

For example, the control box 100-2 may analyze a screen corresponding to an image signal received from the external apparatus 200, may generate a control command corresponding to the operation command received from the remote control device 300, and may transmit the generated control command to the external apparatus 200. In addition, the control box 100-2 may receive an image signal obtained after the control command is executed from the external apparatus 200 and may control the electronic apparatus 100-1 to display the received image signal.

Figure 8:
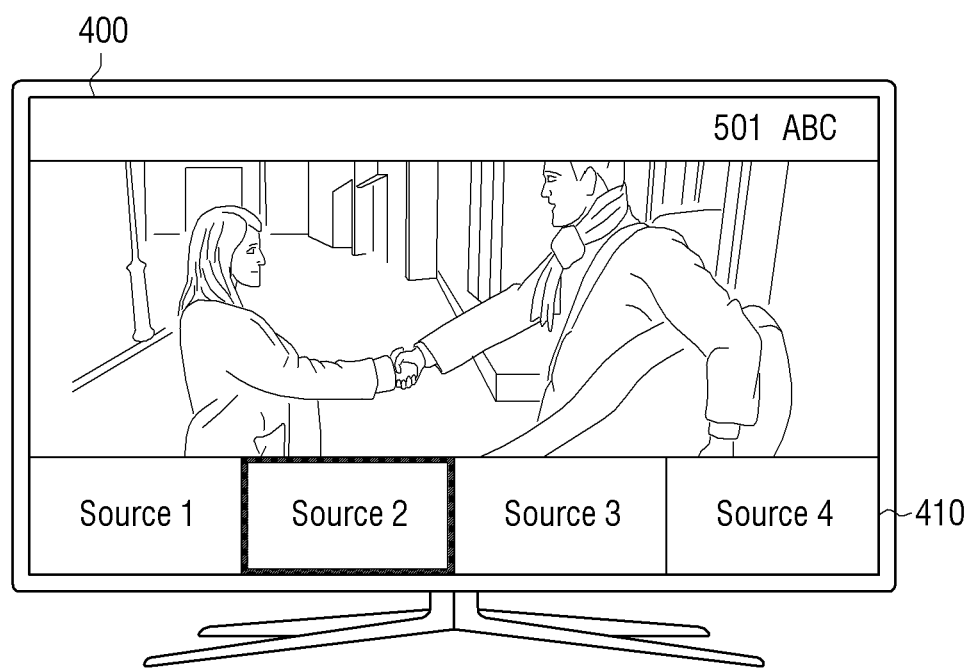
FIGS. 8, 9 and 10 are diagrams illustrating an example embodiment of a screen displayed on an electronic apparatus according to an operation command input.
Figure 9:
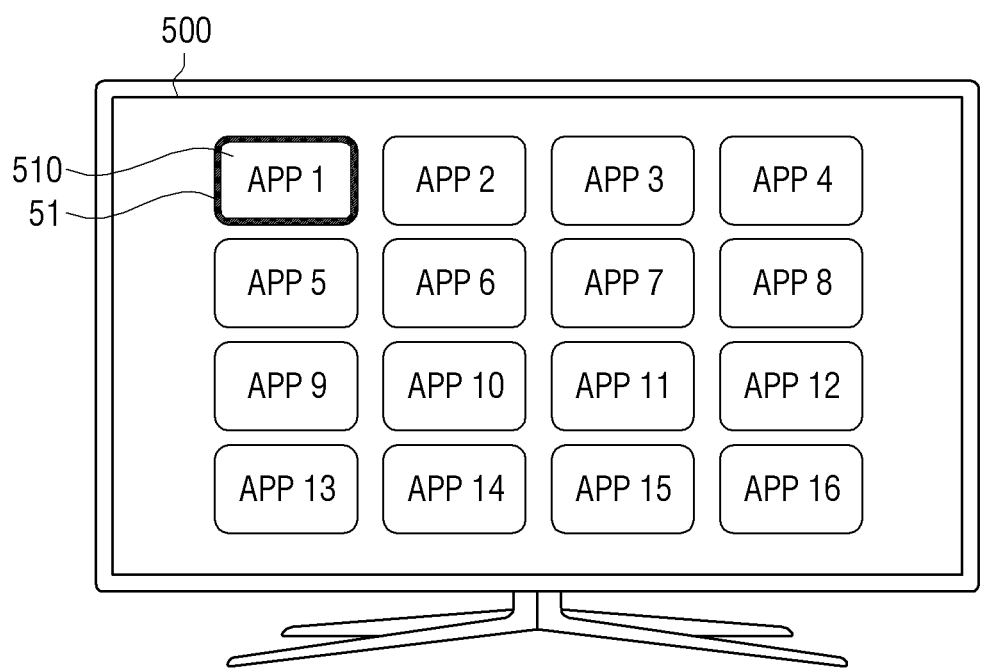
Figure 10:
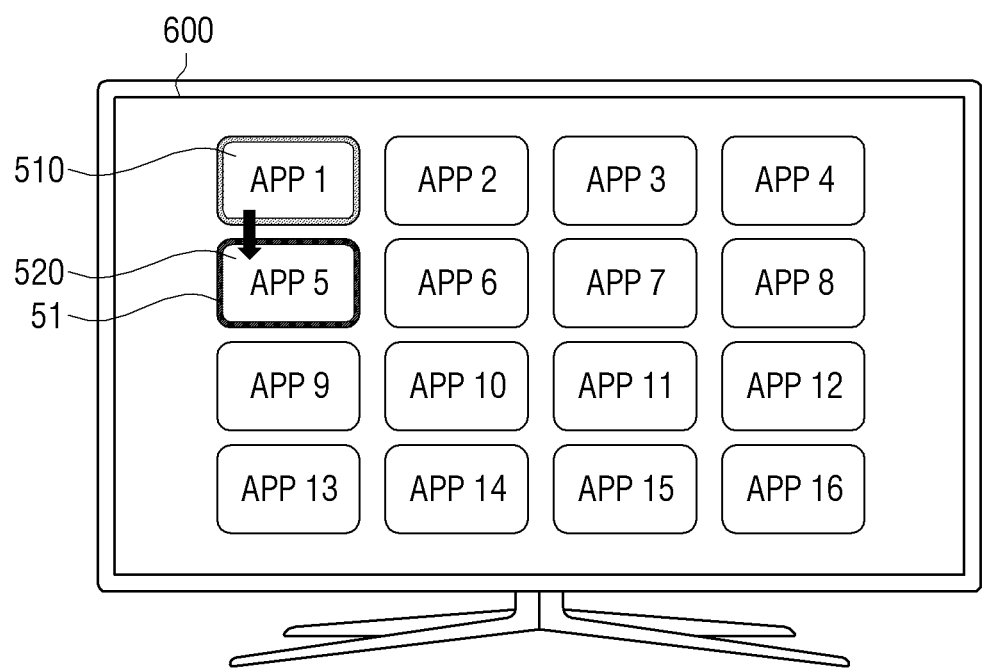

FIGS. 8, 9 and 10 are diagrams illustrating an example embodiment of a screen which is displayed on an electronic apparatus according to an operation command input. For example, FIGS. 8, 9 and 10 illustrate screens displayed in sequence according to an operation command input. For convenience of explanation, it is assumed in FIGS. 8, 9 and 10 that a user inputs a voice command to execute an application 5 (App 5) installed at a source 2 while viewing channel number 501. In practice, for example, the user may input a command using a remote control device or a button or a touch screen provided on the electronic apparatus, in addition to the voice command.

When the user inputs a voice command saying "Please execute App 5" while a broadcast image regarding a channel provided by a broadcasting station is displayed, the electronic apparatus may display a list of external sources 410 connected to the electronic apparatus, and may display a screen 400 indicating that the source 2 having App 5 installed therein is selected, as shown in FIG. 8. The example embodiment is not limited to the case in which a user's operation is input while a broadcast image provided by a broadcasting station is displayed, and can be applied to various cases such as a case in which a content provided by an external apparatus is reproduced.

The electronic apparatus may display a screen 500 provided by the source 2 as shown in FIG. 9. Referring to FIG. 9, the source 2 may have at least App 1 to App 16 installed therein and may provide a screen on which icons for selecting the installed applications are displayed by 4×4. Although FIG. 9 depicts that only one screen is displayed, a movement object may be provided in the screen in practice. Alternatively, a plurality of UI screens for receiving user's control from an external apparatus may be provided. For example, when an operation corresponding to a command "Move to the next page" is input, a next screen having other applications installed therein may be displayed.

In addition, a cursor 51 indicating an application to be selected in the screen 500 provided by the source 2 may be normally placed on App 1 510 which is positioned at row 1, column 1. However, the position of the cursor when the screen is provided is not limited thereto, and may be implemented variously according to settings such as an application selected right before. Another embodiment of the position of the cursor when the screen is provided will be described in greater detail below with reference to FIG. 11.

As shown in FIG. 10, the electronic apparatus may display a screen 600 on which the cursor 51 positioned on App 1 510 is moved to App 5 520. In this case, the screen 600 on which the cursor 51 is moved to App 5 520 may correspond to an image signal obtained after a cursor movement command generated at the electronic apparatus is transmitted to the external apparatus and then the cursor movement command is executed at the external apparatus. Herein, the cursor movement command transmitted from the electronic apparatus to the external apparatus may be a command "Move down one row."

Such a cursor movement command may be generated based on the electronic apparatus analyzing the screen 500 provided by the source 2 as shown in FIG. 9, and determining arrangements of applications included in the screen 500 and types of applications provided by the source 2. The screen analysis operation provided by the external apparatus may be performed when the electronic apparatus and the external apparatus are connected with each other or a user inputs an operation command.

The electronic apparatus may analyze the application on which the cursor is positioned, and may generate an application execution command. For example, when App 5 520 where the cursor 51 is positioned is identical to target object App 5 corresponding to the operation command input by the user as shown in FIG. 10, the electronic apparatus may generate an execution command of the application where the cursor 51 is positioned. The electronic apparatus may transmit the generated execution command to the source 2 which is the external apparatus.

The screens illustrated in FIGS. 8, 9 and 10 may be screens which are continuously displayed according to the operation command input of the user. Accordingly, compared to the related-art method which requires the user to input operation commands step by step, the method of embodiments can provide the same UI screens as those when the user inputs operation commands even if the user inputs a small number of operation commands. Accordingly, user's convenience can be enhanced.

Figure 11:
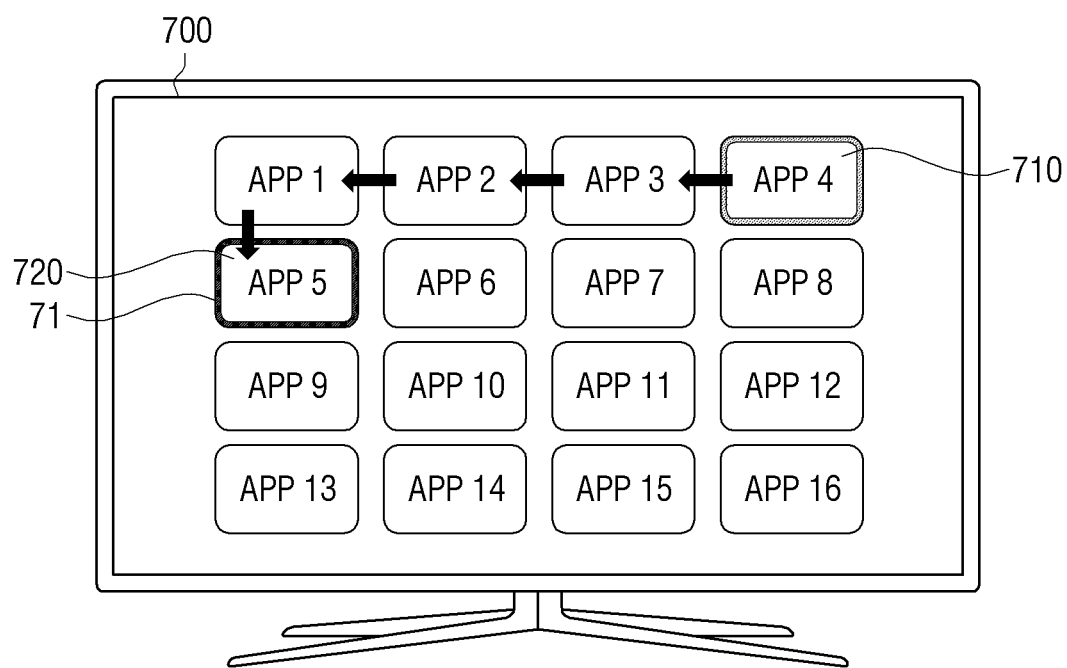
FIG. 11 is a diagram illustrating another example embodiment of a screen displayed on an electronic apparatus according to cursor movement command transmission.

FIG. 11 is a diagram illustrating another example embodiment of a screen displayed on the electronic apparatus according to the transmitted cursor movement command. For example, when the source 2, which is the external apparatus, is selected according to the user's operation command input as shown in FIG. 8, the cursor indicating an application to be selected in the screen provided by the source 2 may be positioned on an application other than the application positioned at row 1, column 1.

Referring to FIG. 11, a cursor in a screen 700 provided by the source 2 may be positioned on App 4 710. The cursor may be positioned on App 4 710 according to user setting, or App 4 710 may be an application executed in the source 2 right before. In this case, the electronic apparatus may analyze the screen 700 provided by the external apparatus and may determine that the cursor is positioned on App 4 710 and may generate a cursor movement command to position the cursor 71 on App 5 720 corresponding to the operation command input by the user. In this case, the electronic apparatus may generate the cursor movement command based on arrangements of applications in the screen 700 provided by the source 2 and types of applications. In this case, the generated cursor movement command may be a command "Move left three columns and move down one row."

The electronic apparatus may transmit the generated cursor movement command to the source 2 which is the external apparatus and may receive image signals obtained after the cursor movement command is executed from the source 2 in sequence and may display corresponding screens. For example, the electronic apparatus may display a screen on which the cursor 71 is positioned on App 4 710, a screen on which the cursor is positioned on App 3, a screen on which the cursor is positioned on App 2, a screen on which the cursor is positioned on App 1, and a screen on which the cursor is positioned on App 5 in sequence, and may display the screens indicating that the cursor 71 is moved from App 4 to App 5 in sequence. These screens may be displayed according to the single command input saying "Please execute App 5!" according to the present disclosure, even when the user does not input the operation commands one by one.

Regarding the cursor movement command, a control command regarding a vertical movement rather than a horizontal movement may be generated first according to settings. When a command "Move right one column" is generated on App 4 which is positioned at the rightmost side, the source 2 receiving this command may transmit an image signal indicating that the cursor 71 is moved to App 5 positioned at column 1 of the next row to the electronic apparatus.

As described above, even when the cursor is not positioned on the application at row 1, column 1 in the screen provided by the external apparatus, the position of the cursor may be determined by analyzing the screen, and a movement command may be generated.

Figure 12:
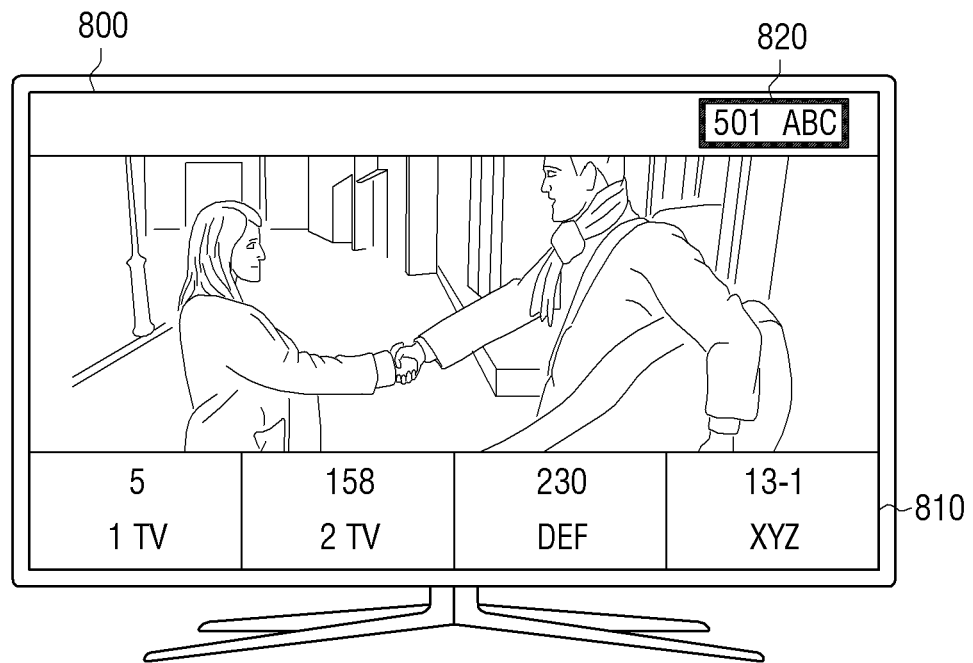
FIG. 12 is a diagram illustrating an example operation of recognizing a screen corresponding to a broadcast signal according to an example embodiment.

FIG. 12 is a diagram illustrating an example operation of recognizing a screen corresponding to a broadcast signal according to an example embodiment. For example, FIG. 12 illustrates a screen displayed when an external apparatus corresponding to an operation command input by a user from among a plurality of external apparatuses connected to the electronic apparatus is a broadcast receiving apparatus.

Referring to FIG. 12, a screen 800 provided by the external apparatus may be a screen corresponding to an image signal received from the broadcast receiving apparatus. In this case, the electronic apparatus may analyze objects in the screen 800. Herein, the electronic apparatus may determine a channel menu 810 regarding channels that the user can view, and channel information 820 of a channel that the user is currently viewing based on the objects in the screen 800.

In this case, the electronic apparatus may generate a cursor movement command to select a channel corresponding to an input user operation command in the channel menu 810. The electronic apparatus may generate a control command to select the channel corresponding to the input user operation command, based on the channel information 820 of the channel that the user is currently viewing. In this case, the generated control command may be a channel change command to change channels step by step to have a target channel or may be inputting the number of the target channel.

Figure 13:
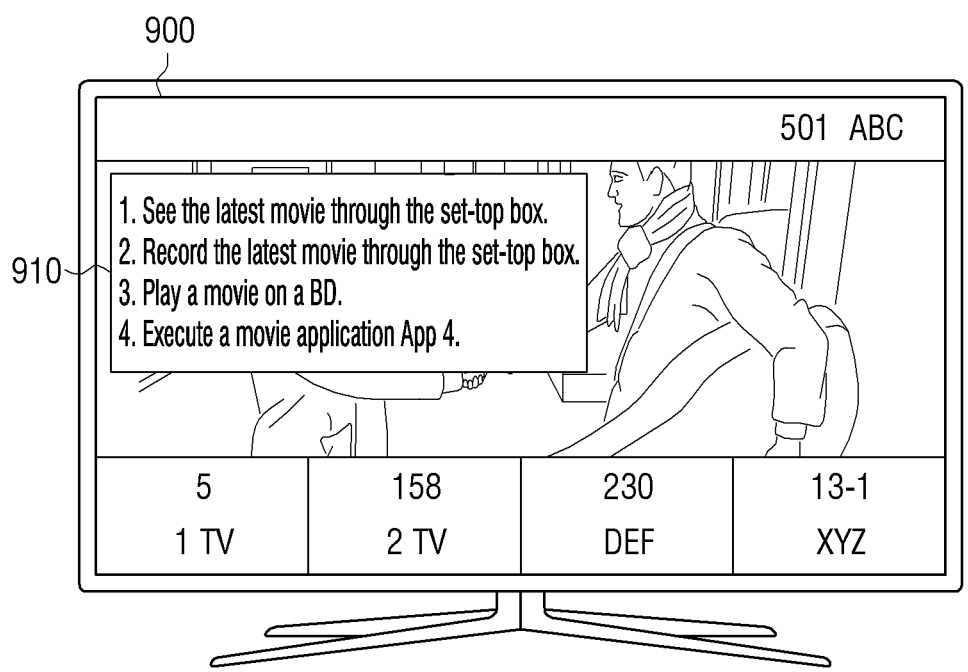
FIG. 13 is a diagram illustrating an example user interface (UI) screen displaying a list of predetermined operation commands according to an example embodiment.

FIG. 13 is a diagram illustrating an example UI screen displaying a list of predetermined operation commands according to an example embodiment.

Referring to FIG. 13, the electronic apparatus may display a list 910 including predetermined operation commands on a screen 900 received from the external apparatus. In this case, when a predetermined event occurs, the electronic apparatus may display the list 910. For example, when the user presses a predetermined button to display the list 901, or inputs a voice command, the electronic apparatus may display the list 910 including the predetermined operation commands.

In this case, the list 910 may be set at the time when the electronic apparatus is manufactured or may be set based on user's using history. In addition, the list 910 may be a mixture of operation commands which are executable at a plurality of external apparatuses connected with the electronic apparatus.

When the user inputs an operation command to execute one operation command in the list 910 including the predetermined operation commands, the electronic apparatus may generate a plurality of control commands corresponding to the selected predetermined operation command, and may transmit the control commands to the external apparatus. The user's operation command to select the predetermined operation command may be selecting the operation command by moving a cursor, selecting a number key provided on a remote control device, or inputting the predetermined operation command by using a voice.

In FIG. 13, the predetermined operation commands may be arranged on a certain region of the screen 900 that the user is viewing in the form of a list. However, there is no limit to displaying the predetermined operation commands. For example, the predetermined operation commands may be displayed on a certain region of the screen 900 that the user is viewing in the form of icons.

For example, when the user selects number '4' using a voice or a button of the remote control device, the electronic apparatus may generate control commands regarding an operation of receiving an image signal from an external apparatus providing App 4, an operation of moving a cursor to select a movie in App 4, and an operation of playing the movie, and may transmit the generated plurality of control commands to the external apparatus, and the external apparatus may perform operations corresponding to the plurality of control commands.

As described above, since the predetermined operation command includes a plurality of control commands to perform the operation corresponding to the operation command, the user may perform operations of various steps through a simple operation command input, and thus there is an effect of enhancing user's convenience.

Figure 14:
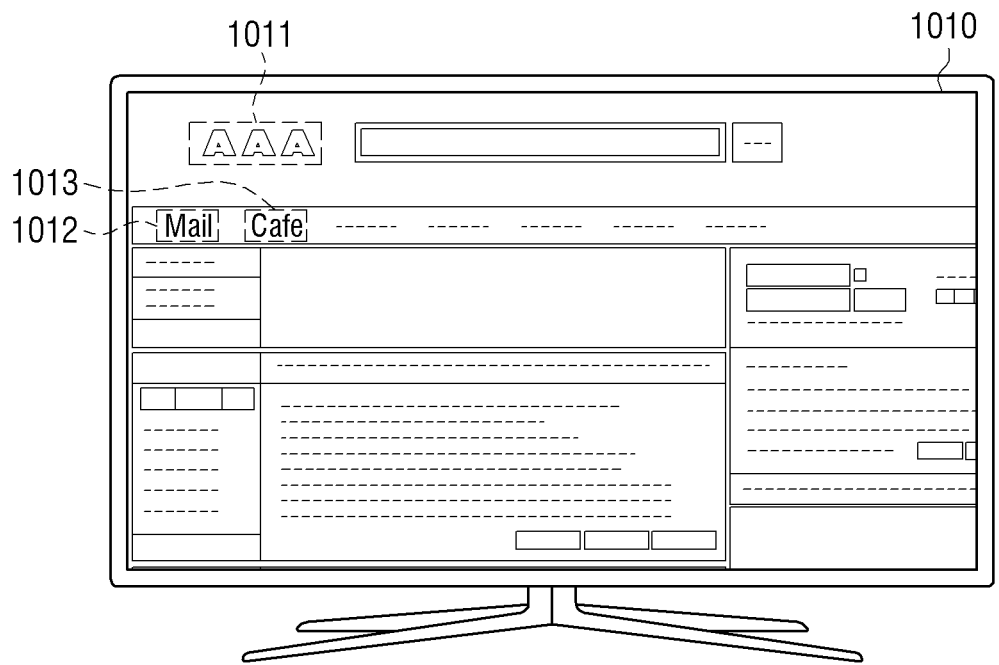
FIG. 14 is a diagram illustrating an example web browser screen for performing a control operation according to an example embodiment.

FIG. 14 is a diagram illustrating an example web browser screen performing a control operation according to an example embodiment.

Referring to FIG. 14, the electronic apparatus may perform the operations according to an embodiment on a screen provided by the electronic apparatus, in addition to a screen received from an external apparatus. For example, the screen provided by the electronic apparatus may be a web browser screen 1010. However, this should not be considered as limiting, and the screen provided by the electronic apparatus may be a screen displaying applications executable at the electronic apparatus as shown in FIG. 9, or may be a screen as shown in FIG. 12 when the electronic apparatus is a broadcast receiving apparatus.

The electronic apparatus may analyze the web browser screen 1010, and may extract a plurality of objects, for example, objects 1011, 1012, 1013, included in the web browser screen 1010. In addition, the electronic apparatus may determine a position of a cursor in the web browser screen 1010. In addition, the electronic apparatus may determine a position of a target object corresponding to an operation command input by the user, using information regarding the extracted objects. In addition, the electronic apparatus may generate a cursor movement command to move the cursor to the target object. For example, when the user inputs a voice command saying "Please connect to the most famous cafe of AAA," the electronic apparatus may execute a web browser and may display a screen indicating connection to the site AAA. In addition, when the cursor is positioned on the object 1011 displaying a home screen of the AAA site at the leftmost side of the uppermost portion in the web browser screen 1010, the electronic apparatus may generate a cursor movement command to move the cursor down one row and move right one column. When the cursor is positioned on the "cafe" tab 1013 from the "AAA" object 1011 through the "mail" tab 1012, the electronic apparatus may generate an execution command to execute the "cafe" tab. In addition, the electronic apparatus may analyze a screen after the cafe tab is executed and may generate a control command to connect to the cafe site having the highest views although it is not illustrated.

The electronic apparatus may display screens in which the above-described operations are executed in phases in sequence.

Figure 15:
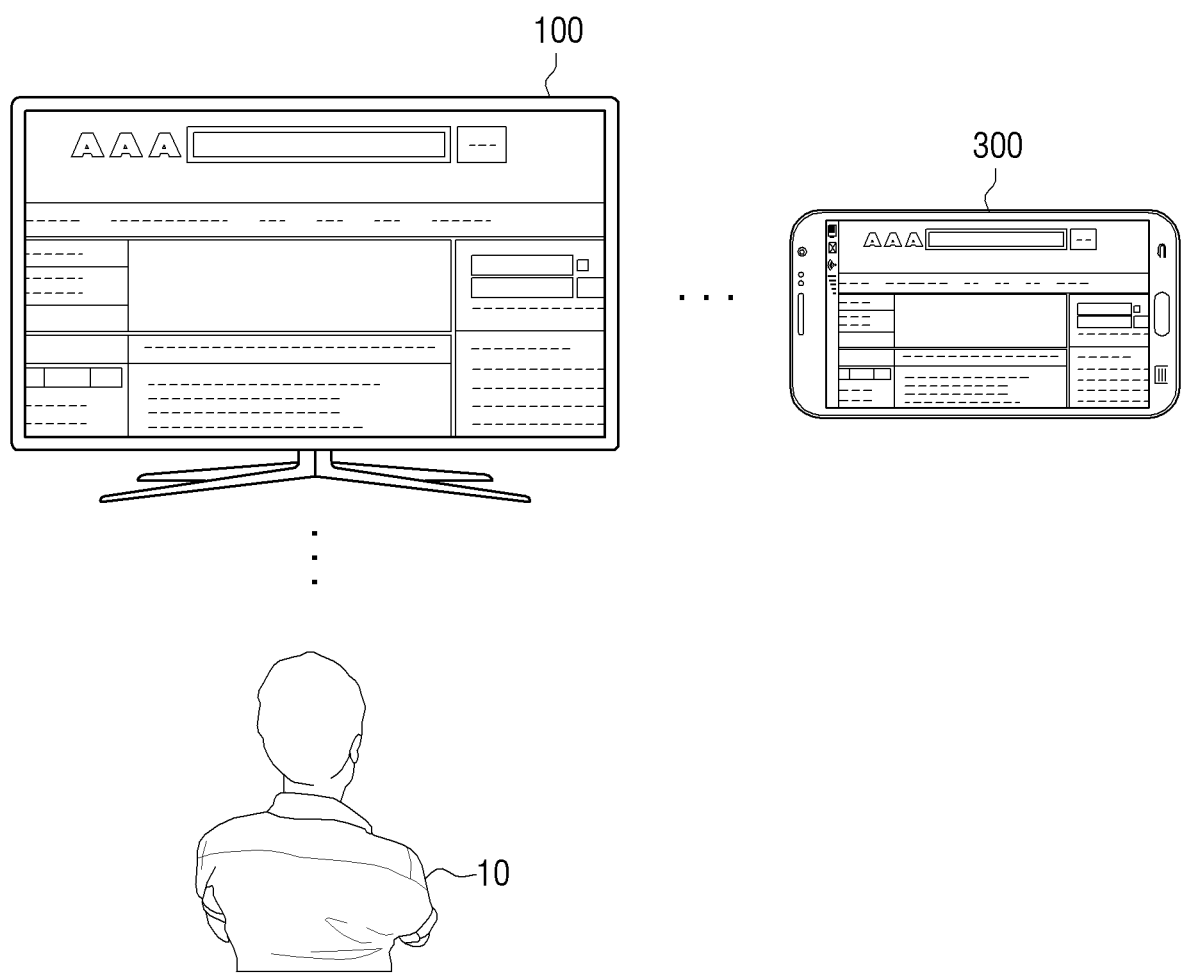
FIG. 15 is a diagram illustrating an example electronic apparatus control system which performs a mirroring operation with an external apparatus according to an example embodiment.

FIG. 15 is a diagram illustrating an example electronic apparatus control system performing a mirroring operation with an external apparatus according to an example embodiment.

Referring to FIG. 15, the electronic apparatus control system 2000 performing the mirroring operation may include an electronic apparatus 100 and an external apparatus 300 communicating with the electronic apparatus 100 in a wired manner or wirelessly. In this case, the external apparatus 300 may be provided with a display, and the electronic apparatus 100 may display a screen which is directly controlled at the external apparatus 300 through the mirroring operation. The mirroring operation may refer, for example, to displaying contents displayed on a single apparatus through peripheral devices connected thereto. Although FIG. 15 depicts that the external apparatus 300 is a smart phone, the external apparatus 300 may include various home appliances such as, for example, and without limitation, a washing machine or a refrigerator provided with a display, a TV, or the like, in practice.

In general, the user may control the screen displayed on the external apparatus 300 and the electronic apparatus 100 by operating the external apparatus 300. However, according to the present disclosure, when the user inputs a voice command to the electronic apparatus 100 or inputs an operation command through a remote control device, the electronic apparatus may transmit a control command generated by analyzing the screen displayed on the display provided therein to the external apparatus 300, and may control the screen.

As described above, the user 10 may not directly control the external apparatus 300 to control the screen, and may control the screen by inputting an operation command to the electronic apparatus 100. Therefore, an effect of enhancing user's convenience can be expected.

Figure 16:
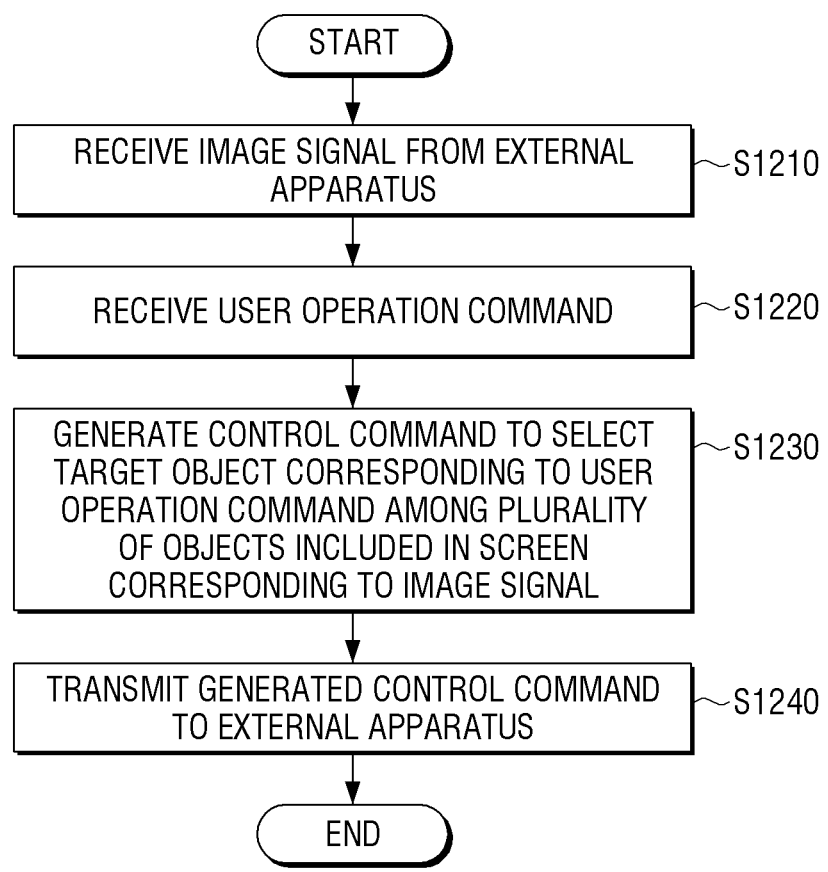
FIG. 16 is a flowchart illustrating an example method of controlling an electronic apparatus according to an example embodiment.

FIG. 16 is a flowchart illustrating an example method of controlling an electronic apparatus according to an example embodiment.

The electronic apparatus may receive an image signal from an external apparatus (S1210). For example, the electronic apparatus may receive the image signal provided by the external apparatus when the external apparatus is connected therewith.

The electronic apparatus may receive a user operation command (S1220). For example, the electronic apparatus may receive a user's voice command or may receive an operation command through a physical button provided on the electronic apparatus or a remote control device communicating with the electronic apparatus.

The electronic apparatus may generate a control command to select a target object corresponding to the user operation command from among a plurality of objects included in the screen corresponding to the image signal (S1230). In this case, the electronic apparatus may recognize an external apparatus which can execute the operation command input by the user although this operation is not illustrated. The electronic apparatus may analyze the screen corresponding to the image signal received from the recognized external apparatus, and may extract and store information regarding the plurality of objects configuring the screen. In addition, the electronic apparatus may generate the control command using the information of the extracted objects and information regarding the target object. In this case, the control command may include at least one of a cursor movement command to move a cursor positioned in the screen, and an execution command to execute an application where the cursor is positioned. The operation of generating such a control command will be described in greater detail below with reference to FIG. 17.

The electronic apparatus may transmit the generated control command to the external apparatus (S1240). In this case, the electronic apparatus may transmit the generated plurality of control commands to the external apparatus at the same time, or may transmit the control commands in sequence.

In addition, the electronic apparatus may receive an image signal obtained after the plurality of control commands are executed one by one from the external apparatus and may display a screen corresponding to the received image signal. Accordingly, the user may be provided with screens in which the plurality of operations is performed.

FIG. 17 is a sequence diagram illustrating an example control command generation method according to an example embodiment.

Referring to FIG. 17, the electronic apparatus 100 may receive a user's operation command first (S1701). In this case, the user's operation command may be input as a user's voice or a control signal from a remote control device. In this case, the electronic apparatus 100 may divide an operation corresponding to the input operation command into a plurality of operations although it is not illustrated. In addition, the electronic apparatus 100 may generate control commands to execute the plurality of operations, respectively.

For example, the electronic apparatus 100 may select an external apparatus to execute the input command (S1702). In this case, the electronic apparatus 100 may select an external apparatus to perform the input command from among a plurality of external apparatuses connected to the electronic apparatus 100, by using a pre-established database. For example, when an application or content execution command is input, the electronic apparatus 100 may select an external apparatus storing the corresponding application or content, based on the pre-stored database. When a specific function performance command is input, the electronic apparatus 100 may select an external apparatus capable of performing the input function, based on the pre-stored database.

The electronic apparatus 100 may receive an image signal transmitted from the selected external apparatus 200 (S1703). In this case, a screen corresponding to the image signal transmitted from the external apparatus 200 may be a home screen through which an application provided by the external apparatus 200 can be selected, or a menu screen through which a function can be selected.

The electronic apparatus 100 may identify a position of a cursor indicating an object to be selected on the screen corresponding to the received image signal (S1704). For example, the electronic apparatus 100 may determine whether the cursor is placed on a default position or a non-default position by analyzing the screen. For example, the default position may be a position of an application arranged on the uppermost end of the left side from among a plurality of applications arranged on the screen. The non-default position may be a position of an application selected right before.

When the electronic apparatus 100 is provided with a display, the electronic apparatus 100 may display the screen including the cursor (S1705). In this case, the displayed screen may be a screen corresponding to the image signal received from the external apparatus 200. When the electronic apparatus 100 is not provided with a display, the electronic apparatus 100 may transmit the image signal received from the external apparatus 200 to a separate display device (not shown), and the display device may perform operation S1705.

The electronic apparatus 100 may identify a position of a target object corresponding to the user's operation command (S1706). For example, the electronic apparatus 100 may identify the position of the target object by analyzing the screen.

The electronic apparatus 100 may generate a control command to move the cursor (S1707). For example, when a plurality of applications are arranged on the home screen of the external apparatus 200 in a grid pattern, the electronic apparatus 100 may generate a plurality of control commands to move the cursor row by row or column by column in four directions.

In another embodiment, when the cursor can be freely moved in the screen rather than being displayed only on an application, the electronic apparatus 100 may generate a control command to move the cursor to the target object via a continuous path such as a straight light or to directly display the cursor on the target object without displaying a moving path of the cursor. In this case, the electronic apparatus 100 may generate a control command to move the cursor to the target object by using coordinates information of the initial position of the cursor and coordinates information of the position of the target object.

The electronic apparatus 100 may transmit the control command to move the cursor to the external apparatus 200 (S1708). In addition, the electronic apparatus 100 may receive an image signal obtained after the transmitted cursor movement command is executed from the external apparatus 200 (S1709).

When the electronic apparatus 100 is provided with a display, the electronic apparatus 100 may display a screen displaying a control state of the moving cursor (S1710). In this case, the displayed screen may be a screen corresponding to the image signal obtained after the movement command is executed and received from the external apparatus 200. When the electronic apparatus 100 is not provided with a display, the electronic apparatus 100 may transmit the image signal received from the external apparatus 200 to a separate display device (not shown), and the display device may perform operation S1710.

The electronic apparatus 100 may generate a control command to execute the target object (S1711). For example, after moving the cursor to the target object through the cursor movement command, the electronic apparatus 100 may generate the control command to execute the target object where the cursor is positioned (S1711).

In addition, the electronic apparatus 100 may transmit the control command to execute the target object to the external apparatus 200 (S1712). In addition, the electronic apparatus 100 may receive an image signal obtained after the target object is executed from the external apparatus 200 (S1713).

When the electronic apparatus 100 is provided with a display, the electronic apparatus 100 may display a result of executing the target object (S1714). In this case, the displayed screen may be a screen corresponding to the image signal obtained after the target object execution command is performed and received from the external apparatus 200. When the electronic apparatus 100 is not provided with a display, the electronic apparatus 100 may transmit the image signal received from the external apparatus 200 to a separate display device (not shown), and the display device may perform operation S1714.

In the above-described embodiment, control command generation and control command transmission are performed in every operation of the plurality of operations included in the user operation command. However, the electronic apparatus 100 may general all control commands corresponding to the plurality of operations and may transmit the generated plurality of control commands to the external apparatus 200. That is, the electronic apparatus 100 may generate the target object execution command after generating the cursor movement command, may transmit the generated plurality of control commands to the external apparatus 200, may receive and display the image signal obtained after the cursor movement command is executed, and may receive and display the image signal obtained after the target object is executed.

According to various example embodiments described above, even when the user inputs the operation command to the electronic apparatus rather than to the external apparatus, the external apparatus can be controlled and thus a separate device for controlling the external apparatus is not required. In addition, compared to the related-art method which requires input of many operation commands to control the external apparatus, the method according to various example embodiments can control the same operations with a single operation command input, and thus user's convenience can be enhanced.

Various example embodiments described above may be implemented in a recording medium that can be read by a computer or a similar device using software, hardware, or any combination thereof. According to hardware implementation, embodiments described in the present disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, an electric unit (circuit), or the like, for performing other functions. In some cases, embodiments described in the present disclosure may be implemented by a processor itself. According to software implementation, embodiments such as procedures and functions described in the detailed description may be implemented by using separate software modules. Each of the software modules may perform one or more functions and operations described in the detailed description.

The control method of the electronic apparatus according to the above-described various embodiments may be stored in a non-transitory computer readable medium. The non-transitory computer readable medium may be mounted and used in various devices.

The non-transitory computer readable medium refers to a medium that stores data semi-permanently and is readable by an apparatus. For example, programs for performing the above-described various methods may be stored in the non-transitory computer readable medium such as, for example, and without limitation, a compact disc (CD), a digital versatile disk (DVD), a hard disk, a Blu-ray disk, a universal serial bus (USB), a memory card, and a ROM, and may be provided.

According to an embodiment, the method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

While the disclosure has been illustrated and described with reference to various example embodiments thereof, it will be understood by those skilled in the art that various changes in form and details may be made therein without departing from the spirit and scope of the disclosure as defined, for example, by the appended claims. Therefore, the scope of the disclosure is defined not only by the detailed description of the disclosure but also by the appended claims, and all differences within the scope will be understood as being included in the present disclosure.

What is claimed is:

1. An electronic apparatus comprising:
 a communicator comprising communication circuitry configured to receive image signals from a plurality of external apparatuses;
 an input receiver comprising input receiving circuitry configured to receive a user input;
 a display; and
 a processor configured to control the electronic apparatus to:
 receive, from each of a plurality of external apparatuses connected to the electronic apparatus, screen information output by the plurality of external apparatuses;
 obtain at least one of a logo or a manufacturer name, corresponding the each of the plurality of external apparatuses by applying an artificial intelligence system;
 obtain information identifying the plurality of external apparatuses connected to the electronic apparatus based on the obtained at least one of the logo or the manufacturer name, wherein the information identifying at least one of the plurality of external apparatuses is identified;
 control the display to display a first screen including first content received from a first external apparatus of the plurality of external apparatuses in a first portion of the first screen, a plurality of objects corresponding to the plurality of external apparatuses connected to the electronic apparatus in a second portion of the first screen, and a list, set based on user's using history of the plurality of external apparatuses, including a plurality of predetermined operation commands executable at one or more of the plurality of external apparatuses connected to the electronic apparatus in a third portion of the first screen,
 during the display of the first screen, receive a first user input to execute a first application among a plurality of applications executable by the plurality of external apparatuses connected to the electronic apparatus;
 in response to receiving the first user input, extract information regarding one or more applications that can be provided by each of the plurality of external apparatuses based on the screen information received from the plurality of external apparatuses, identify an external apparatus including the first application, from among the plurality of external apparatuses, based on the extracted information, and select a first object, from among the plurality of displayed objects corresponding to the plurality of external apparatuses, corresponding to the identified external apparatus including the first application;

in response to selecting the first object corresponding to the identified external apparatus, controlling the display to display a second screen including a plurality of application objects corresponding to a plurality of applications included in the identified external apparatus based on an image signal received from the identified external apparatus;
analyze the second screen provided by the identified external apparatus;
determine arrangements of applications included in the second screen and types of applications provided by the identified external apparatus;
identify a current position of a cursor on the second screen;
identify a first application object where the cursor is positioned from among the plurality of application objects in the second screen;
identify a second application object corresponding to the first application from among the plurality of application objects included in the second screen;
generate a first control signal to move the cursor from the first application object to the second application object based on the determined arrangements and the determined types of applications;
control the communicator to transmit the first control signal to the identified external apparatus;
receive an image signal obtained after the transmitted first control signal is executed from the identified external apparatus;
display a third screen including a plurality of application objects and the cursor which is moved from first application object to the second application object;
when an application object where the cursor is currently positioned after the first control signal is transmitted is the second application object, generate a second control signal to execute the first application corresponding to the second application object where the cursor is currently positioned; and
control the communicator to transmit the second control signal to the identified external apparatus,
wherein the selecting the identified external apparatus and the control signal including the plurality of control signals for the cursor are provided in response to the first user input without receiving additional user inputs for selecting the first application.

2. The electronic apparatus of claim 1, wherein, the processor is configured to control the electronic apparatus to control the communicator to transmit a plurality of four-direction movement control signal to the identified external apparatus in sequence on a predetermined time interval when the cursor movement control signal comprises the plurality of four-direction movement control signal.

3. The electronic apparatus of claim 1, wherein the input receiver is configured to receive a user voice signal, and
wherein the processor is configured to control the electronic apparatus to identify the second application object from among the plurality of application objects in the second screen based on a voice recognition result of the input voice signal.

4. The electronic apparatus of claim 3, wherein the processor is configured to control the electronic apparatus to obtain keywords of the plurality of application objects in the second screen by analyzing images regarding the plurality of application objects, and to identify the second application object from among the plurality of application objects in the second screen based on the obtained keywords and the voice recognition result.

5. The electronic apparatus of claim 1, further comprising a memory configured to store a control signal regarding a predetermined user input,
wherein, the processor is configured to control the electronic apparatus to control the communicator to transmit the stored control signal to the identified external apparatus when the predetermined user input is input through the input receiver.

6. The electronic apparatus of claim 1, wherein the communicator is configured to receive an image signal from each of the plurality of external apparatuses, and
wherein the processor is configured to control the electronic apparatus to identify an external apparatus to provide a second screen including the second application object from among the plurality of external apparatuses, and to control the communicator to transmit the determined control signal to the identified external apparatus.

7. The electronic apparatus of claim 1, wherein the processor is configured to control the electronic apparatus to generate a control signal comprising an instruction for executing an application and/or a content corresponding to the second application object.

8. A method of controlling an electronic apparatus, the method comprising:
receiving, from each of a plurality of external apparatuses connected to the electronic apparatus, screen information output by the plurality of external apparatuses;
obtaining at least one of a logo or a manufacturer name, corresponding the each of the plurality of external apparatuses by applying an artificial intelligence system;
obtaining information identifying the plurality of external apparatuses connected to the electronic apparatus based on the obtained at least one of the logo or the manufacturer name, wherein the information identifying at least one of the plurality of external apparatuses is identified;
receiving first content from a first external apparatus of the plurality of external apparatuses;
displaying a first screen including the first content in a first portion of the first screen, a plurality of objects corresponding to the plurality of external apparatuses connected to the electronic apparatus in a second portion of the first screen, and a list, set based on user's using history of the plurality of external apparatuses, including a plurality of predetermined operation commands executable at one or more of the plurality of external apparatuses connected to the electronic apparatus in a third portion of the first screen;
during the displaying of the first screen, receiving a first user input to execute a first application among a plurality of applications executable by the plurality of external apparatuses connected to the electronic apparatus;
in response to receiving the first user input, extracting information regarding one or more applications that can be provided by each of the plurality of external apparatuses based on the screen information received from the plurality of external apparatuses, identifying an external apparatus including the first application, from among the plurality of external apparatuses, based on the extracted information, and selecting a first object, from among the plurality of displayed objects corresponding to the plurality of external apparatuses, corresponding to the identified external apparatus including the first application;

in response to selecting the first objection corresponding to the identified external apparatus, displaying a second screen including a plurality of application objects corresponding to a plurality of applications included in the identified external apparatus based on an image signal received from the identified external apparatus;

analyzing the second screen provided by the identified external apparatus;

determining arrangements of applications included in the second screen and types of applications provided by the identified external apparatus;

identifying a current position of a cursor on the second screen;

identifying a first application object where the cursor is positioned from among the plurality of application objects in the second screen;

identifying a second object corresponding to the first application from among the plurality of application objects included in the second screen;

generating a first control signal to move the cursor from the first application object to the second application object based on the determined arrangements and the determined types of applications;

transmitting the first control signal to the identified external apparatus;

receiving an image signal obtained after the transmitted first control signal is executed from the identified external apparatus;

displaying a third screen including a plurality of application objects and the cursor which is moved from first application object to the second application object;

when an application object where the cursor is currently positioned after the first control signal is transmitted is the second application object, generating a second control signal to execute the first application corresponding to the second application object where the cursor is currently positioned; and transmitting the second control signal to the identified external apparatus, wherein the selecting the identified external apparatus and the control signal including the plurality of control signals for the cursor are provided in response to the first user input without receiving additional user inputs for selecting the first application.

9. The method of claim 8, wherein the transmitting comprises, transmitting a plurality of four-direction movement control signals to the identified external apparatus in sequence on a predetermined time interval when the cursor movement control signal comprises the plurality of four-direction movement control signal.

10. The method of claim 8, wherein the receiving the input comprises receiving a user voice signal, and wherein the providing comprises generating a control signal to select the second application object which is identified based on a voice recognition result of the input voice signal.

11. The method of claim 10, wherein the providing comprises obtaining keywords of the plurality of application objects in the second screen by analyzing images regarding the plurality of application objects in the second screen, and generating a control signal to select the second application object identified based on the obtained keywords and the voice recognition result.

12. The method of claim 8, further comprising:

receiving an image signal from each of a plurality of external apparatuses; and identifying an external apparatus to provide a second screen including the second application object from among the plurality of external apparatuses, wherein the transmitting comprises transmitting the control signal to the identified external apparatus.

13. A non-transitory computer readable recording medium having recorded thereon a program for executing a control method of an electronic apparatus, the method comprising:

receiving, from each of a plurality of external apparatuses connected to the electronic apparatus, screen information output by the plurality of external apparatuses;

obtaining at least one of a logo or a manufacturer name, corresponding the each of the plurality of external apparatuses by applying an artificial intelligence system;

obtaining information identifying the plurality of external apparatuses connected to the electronic apparatus based on the obtained at least one of the logo or the manufacturer name, wherein the information identifying at least one of the plurality of external apparatuses is identified;

receiving first content from a first external apparatus of the plurality of external apparatuses;

displaying a first screen including the first content in a first portion of the first screen, a plurality of objects corresponding to the plurality of external apparatuses connected to the electronic apparatus in a second portion of the first screen, and a list, set based on user's using history of the plurality of external apparatuses, including a plurality of predetermined operation commands executable at one or more of the plurality of external apparatuses connected to the electronic apparatus in a third portion of the first screen;

during the displaying of the first screen, receiving a first user input to execute a first application among a plurality of applications executable by the plurality of external apparatuses connected to the electronic apparatus;

in response to receiving the first user input, extracting information regarding one or more applications that can be provided by each of the plurality of external apparatuses based on the screen information received from the plurality of external apparatuses, identifying an external apparatus from among the plurality of external apparatuses including the first application based on the extracted information, and selecting a first object, from among the plurality of displayed objects corresponding to the plurality of external apparatuses, corresponding to the identified external apparatus including the first application;

in response to selecting the first object corresponding to the identified external apparatus, displaying a second screen including a plurality of application objects corresponding to a plurality of applications included in the identified external apparatus based on an image signal received from the identified external apparatus;

analyzing the second screen provided by the identified external apparatus;

determining arrangements of applications included in the second screen and types of applications provided by the identified external apparatus;

identifying a current position of a cursor on the second screen;

identifying a first application object where the cursor is positioned from among the plurality of application objects in the second screen;

identifying a second object corresponding to the first application from among the plurality of application objects included in the second screen;

generating a first control signal to move the cursor from the first application object to the second application object based on the determined arrangements and the determined types of applications;

transmitting the first control signal to the identified external apparatus;

receiving an image signal obtained after the transmitted first control signal is executed from the identified external apparatus;

displaying a third screen including a plurality of application objects and the cursor which is moved from first application object to the second application object;

when an application object where the cursor is currently positioned after the first control signal is transmitted is the second application object, generating a second control signal to execute the first application corresponding to the second application object where the cursor is currently positioned; and transmitting the second control signal to the identified external apparatus, wherein the selecting the identified external apparatus and the control signal including the plurality of control signals for the cursor are provided in response to the first user input without receiving additional user inputs for selecting the first application.

* * * * *